United States Patent
Nozawa et al.

(10) Patent No.: US 6,587,505 B1
(45) Date of Patent: Jul. 1, 2003

(54) IMAGE PROCESSING APPARATUS AND METHOD

(75) Inventors: Shingo Nozawa, Tokyo (JP); Taizo Hori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/384,972

(22) Filed: Aug. 3, 1999

(30) Foreign Application Priority Data

| Aug. 31, 1998 | (JP) | 10-259193 |
| Jan. 19, 1999 | (JP) | 11-010981 |
| Jun. 29, 1999 | (JP) | 11-184211 |
| Aug. 2, 1999 | (JP) | 11-219294 |

(51) Int. Cl.$^7$ ................................ H04B 1/66
(52) U.S. Cl. ..................................... 375/240
(58) Field of Search ............... 348/397.1, 387, 348/398.1, 564; 375/240, 240.1, 240.11, 240.19; 382/240, 239

(56) References Cited

U.S. PATENT DOCUMENTS

| 5,550,589 A | * | 8/1996 | Shiojiri et al. | 348/387 |
| 5,953,456 A | | 9/1999 | Ikeda et al. | 382/232 |
| 5,953,460 A | * | 9/1999 | Wu | 382/239 |
| 5,963,678 A | | 10/1999 | Nozawa | 385/299 |
| 6,020,923 A | * | 2/2000 | Hosaka et al. | 348/409 |
| 6,091,775 A | * | 7/2000 | Hibi et al. | 375/240 |
| 6,128,342 A | * | 10/2000 | Kikuchi et al. | 375/240 |
| 6,295,093 B1 | * | 9/2001 | Park et al. | 348/473 |
| 6,333,950 B1 | * | 12/2001 | Karasawa | 375/240.23 |
| 2001/0043751 A1 | * | 11/2001 | Takahashi et al. | 382/240 |

* cited by examiner

Primary Examiner—Chris Kelley
Assistant Examiner—Behrooz Senfi
(74) Attorney, Agent, or Firm—Fitzpatrick, Cella, Harper & Scinto

(57) ABSTRACT

There are provided an image processing apparatus and its method, in which a first image signal and a second image signal whose resolution is higher than that of the first image signal is selectively inputted, a low frequency component and a high frequency component are separated from the second image signal, the first image signal or an image signal of the separated low frequency component is encoded, and an image signal of the separated high frequency component is encoded.

14 Claims, 16 Drawing Sheets

IMAGE PROCESSING APPARATUS AND METHOD

BACKGROUND OF THE INVENTION

1. Field of the Invention

The invention relates to an image processing apparatus for high-efficiently encoding/decoding an image signal and a method for such an apparatus.

2. Related Background Art

In recent years, owing to the advancement of digital signal processing techniques, a large amount of digital information such as motion image, still image, audio sound, or the like can be high-efficiently encoded, recorded to a small magnetic medium, and transmitted to a communication medium. Multimedia equipment which can mixedly handle a motion image and a still image and, further, a plurality of video images of different resolutions by using those techniques is being examined.

FIG. 1 shows a conventional constructional example of a high efficient coding apparatus which can mixedly record/reproduce a motion image of a low resolution and a still image of a high resolution.

In FIG. 1, either a low resolution video signal or a high resolution video signal is selectively inputted to a video signal input terminal 101 and supplied to a low resolution video coding circuit 102 and a high resolution video coding circuit 103. Each of the low resolution video coding circuit 102 and high resolution video coding circuit 103 performs processes such as orthogonal transformation, quantization, and variable length coding to the signal which is supplied, thereby high-efficiently encoding the signal and transmitting the encoded signal to a switching circuit 104.

The switching circuit 104 selects the signal supplied from the low resolution video coding circuit 102 when the input signal to the input terminal 101 is the low resolution video signal. The switching circuit 104 selects the signal supplied from the high resolution video coding circuit 103 when the input signal to the input terminal 101 is the high resolution video signal. The selected signal is recorded onto a recording medium 105.

An audio signal which is inputted to an audio signal input terminal 106 is encoded by an audio coding circuit 107 and recorded onto the recording medium 105. An additional information signal which is inputted to an additional information input terminal 108 is encoded by an additional information coding circuit 109 and recorded into a video recording area on the recording medium 105.

That is, in the apparatus, only either the low resolution video coding circuit 102 or the high resolution video coding circuit 103 is validated by the switching circuit 10-4 and only either one of their outputs is recorded onto the recording medium 105, hereby realizing the high efficient coding for the video signals of a plurality of resolutions.

FIG. 2 shows a constructional example of a conventional decoding apparatus.

In FIG. 2, a video code recorded on a recording medium 201 is supplied to a low resolution video decoding circuit 202 and a high resolution video decoding circuit 203. Each of the low resolution video decoding circuit 202 and high resolution video decoding circuit 203 performs processes such as variable length decoding, inverse quantization, and inverse orthogonal transformation to the supplied video code, thereby decoding it to the original video signal and transmitting the decoded signal to a switching circuit 204.

The switching circuit 204 selects the signal supplied from the low resolution video decoding circuit 202 when the video code supplied from the recording medium 201 is the low resolution video image. The switching circuit 204 selects the signal supplied from the high resolution video decoding circuit 203 when the video code supplied from the recording medium 201 is the high resolution video image. The selected signal is outputted to a video signal output terminal 205.

An audio code recorded on the recording medium 201 is decoded to an audio signal by an audio decoding circuit 206 and outputted from an audio signal output terminal 207. Similarly, an additional information code recorded on the recording medium 201 is decoded to the additional information signal by an additional information decoding circuit 208 and outputted from an additional information signal output terminal 209.

In the above conventional apparatus, when the motion image of the low resolution and the still image of the high resolution are mixedly processed, since the different coding/decoding circuits are used for the motion image of the low resolution and the still image of the high resolution, a very large circuit scale is required. Generally, in many cases, the MPEG1 system is used for the coding/decoding circuit of the motion image of the low resolution and the JPEG system is used for the coding/decoding circuit of the still image of the high resolution. Further, the recording medium on which the still image of the high resolution has been recorded by the above apparatus cannot be used at all in a conventional apparatus corresponding only to the motion image of the low resolution.

As a simpler conventional construction, an apparatus such that a still image of a high resolution is divided into a plurality of still images of a low resolution and a coding/decoding circuit of a low resolution is used in common has been proposed. However, since distortion, aliasing, and oscillation occur in the image due to the image division, reproducibility in case of reproducing an image by the conventional apparatus is low. Particularly, when still images are continuously reproduced in a manner similar to a motion image, such distortion, aliasing noise, and oscillation occur like noises.

SUMMARY OF THE INVENTION

In consideration of the circumstances as mentioned above, it is an object of the invention to provide an image processing apparatus which can mixedly perform high efficient coding/decoding processes to a low resolution image and a high resolution image by a small circuit scale while a high picture quality is maintained without losing compatibility with an apparatus corresponding only to the low resolution image and to provide a method for such an apparatus.

For this purpose, according to one aspect of the present invention, there is provided an image processing apparatus/method comprising the steps of: selectively inputting a first image signal and a second image signal whose resolution is higher than that of the first image signal; separating a low frequency component and a high frequency component from the second image signal; encoding the first image signal or the image signal of the separated low frequency component; and encoding the image signal of the separated high frequency component.

According to another aspect of the present invention, there is provided an image processing apparatus/method comprising the steps of: separating a low frequency component and a high frequency component from a first image signal; converting a resolution of the image signal of the low frequency component and encoding the converted image signal; encoding the image signal of the high frequency component; and decoding the image signal of the low frequency component and the image signal of the high frequency component which were independently encoded, wherein the encoded image signal of the low frequency component is decoded, the encoded image signal of the high frequency component is decoded, and the decoded image signal of the low frequency component and the decoded image signal of the high frequency component are synthesized.

According to still another aspect of the present invention, there is provided an image processing apparatus/method for storing an encoded motion image signal constructed by (n×m) pixels into an image storage area on a recording medium, comprising the steps of: receiving an image signal constructed by (N×M) pixels (N>n, M>m); extracting the image signal of (n×m) pixels corresponding to a low frequency component of the received image signal; encoding the extracted image signal of (n×m) pixels; storing the encoded image signal into the image storage area on the recording medium; extracting a high frequency component of the image signal constructed by (N×M) pixels; encoding the extracted high frequency component; and storing the encoded high frequency component into a storage area different from the image storage area on the recording medium.

According to further another aspect of the present invention, there is provided an image processing apparatus/method comprising the steps of: inputting an image signal; extracting a low frequency component signal from the image signal; extracting a first high frequency component signal from the image signal; extracting a second high frequency component signal from the low frequency component signal; encoding the low frequency component signal; and encoding the first high frequency component signal and the second high frequency component signal.

According to further another aspect of the present invention, there is provided an image processing apparatus/method comprising the steps of: inputting encoded signals provided by separating a low frequency component and a high frequency component of an image and encoding the separated frequency components, respectively; decoding the encoded signal of the low frequency component, thereby forming a first low frequency component signal; extracting a second low frequency component signal from the first low frequency component signal; decoding the encoded signal of the high frequency component, thereby forming first and second high frequency component signals; and synthesizing the second low frequency component signal and the first and second high frequency component signals, thereby forming an image signal of a predetermined resolution.

According to further another aspect of the present invention, there is provided an image processing apparatus/method comprising the steps of: inputting first image data; dividing the first image data into first low frequency component data and first high frequency component data; encoding the first low frequency component data; encoding the first high frequency component data; extracting second high frequency component data from the first low frequency component data; and encoding the second high frequency component data in accordance with predetermined conditions.

According to further another aspect of the present invention, there is provided an image processing apparatus/ method comprising the steps of: inputting encoded data provided by separating image data into first low frequency component data and first high frequency component data and encoding the separated frequency components respectively, and encoded data obtained by encoding a second high frequency component extracted from the first low frequency component data; decoding the encoded data of the first low frequency component; decoding the encoded data of the first and second high frequency components; synthesizing the decoded first low frequency component data and the decoded second high frequency component data and outputting synthetic data; and synthesizing the synthetic data and the decoded first high frequency component data.

Other objects, features and advantages of the invention will become apparent from the following detailed description taken in conjunction with the accompanying drawings.

DETAILED DESCRIPTION OF THE PREFERRED EMBODIMENTS

Figure 1:
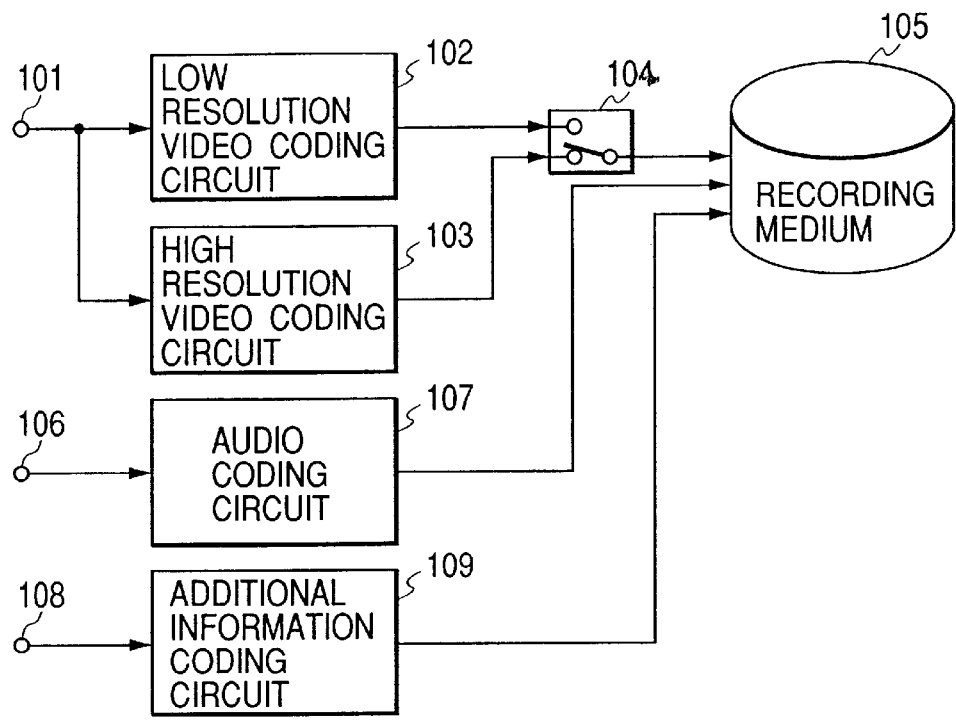
FIG. 1 is a block diagram of a conventional coding apparatus.
Figure 2:
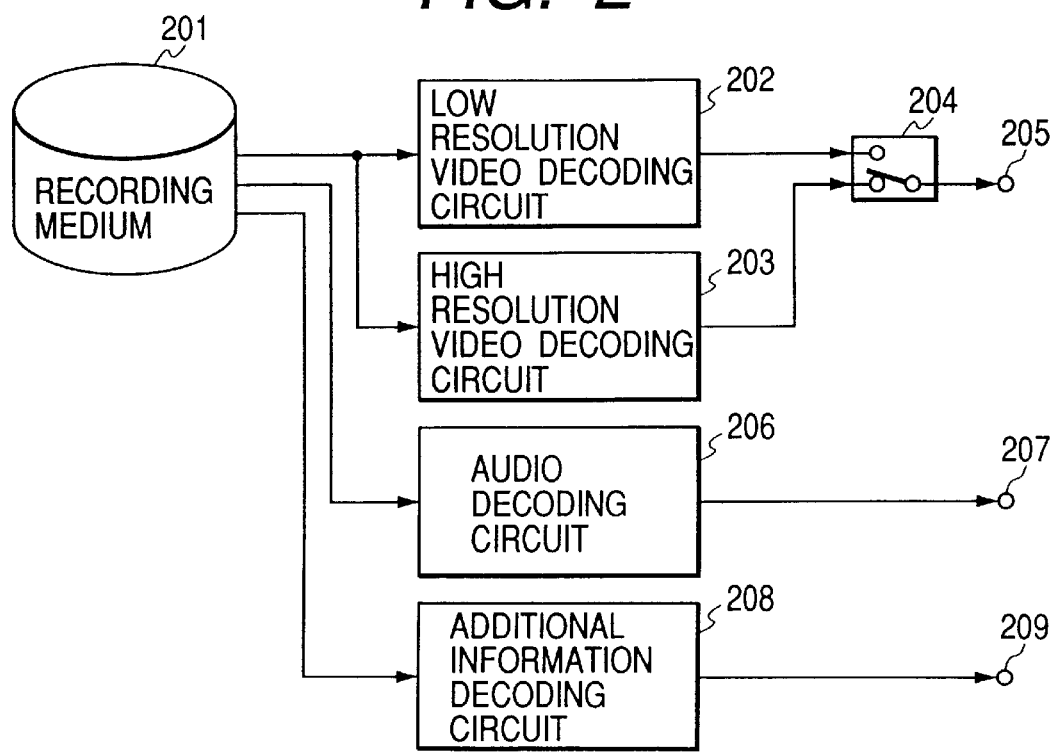
FIG. 2 is a block diagram of a conventional decoding apparatus.
Figure 3:
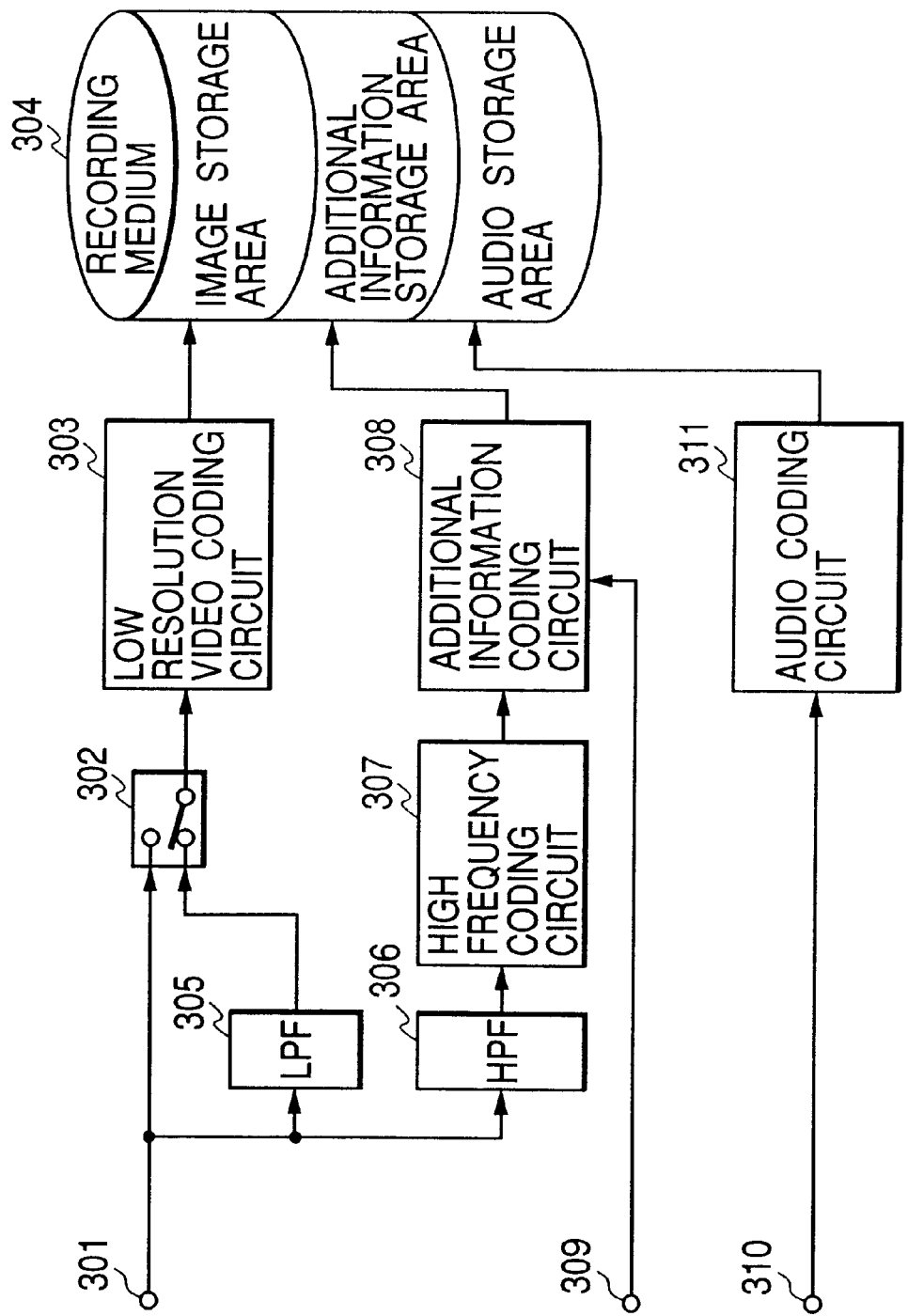
FIG. 3 is a block diagram of a coding apparatus of the first embodiment according to the invention.

FIG. 3 is a block diagram of a high efficient coding apparatus of the first embodiment according to the invention.

First, the case where a video signal (motion image) of a low resolution is inputted to a video input terminal 301 will be described.

The low resolution video signal supplied to the video input terminal 301 is transmitted to a low resolution video coding circuit 303 via a switching circuit 302. The low resolution video coding circuit 303 performs processes such as orthogonal transformation, quantization, and variable length coding to the supplied video signal, compresses an information amount thereof, and records the compressed signal onto a recording medium 304.

An additional information signal which is supplied to an additional information input terminal 309 and an audio signal which is supplied to an audio signal input terminal 310 are transmitted to an additional information coding circuit 308 and an audio coding circuit 311 and encoded. After that, the encoded signals are recorded onto the recording medium 304.

Figure 4:
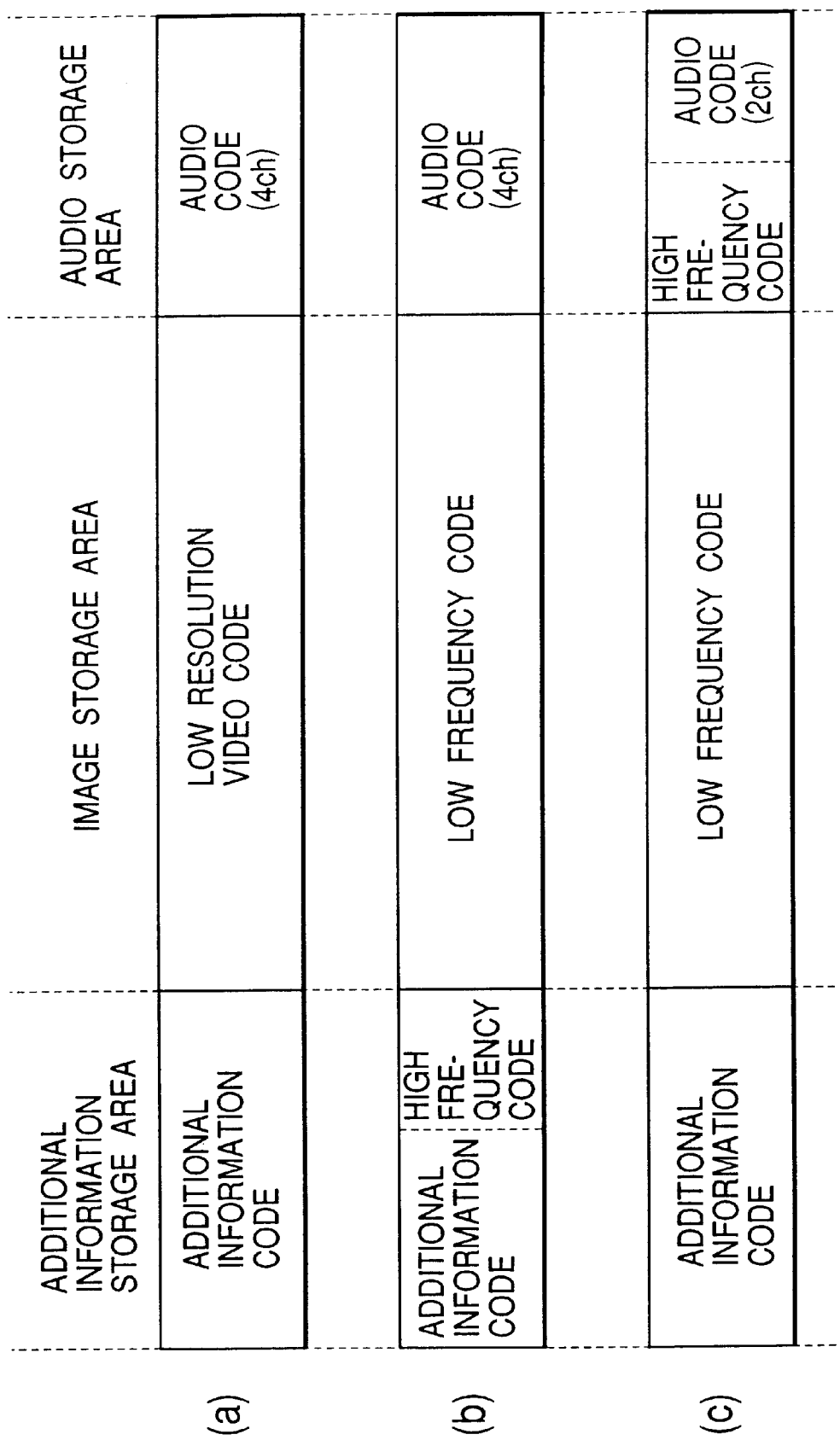
FIG. 4 is a diagram showing a storing state of data in each storage area on a recording medium according to the embodiment.

As a result of the above processes, each code is stored in each storage area of every frame on the recording medium 304 in a form as shown in a column (a) in FIG. 4.

The case where a video signal (still image) of a high resolution is inputted to the video input terminal 301 will now be described.

The high resolution video signal supplied to the video input terminal 301 is sent to a low pass filter 305 and a high pass filter 306. The low pass filter 305 extracts a low frequency component of the supplied high resolution video signal, converts it into a low resolution video signal having the same number of pixels as that of the low resolution video signal, and supplies it to the switching circuit 302.

The switching circuit 302 transmits the video sign al supplied from the low pass filter 305 to the low resolution video coding circuit 303. The low resolution video coding circuit 303 executes processes such as orthogonal transformation, quantization, and variable length coding to the video signal, compresses an information amount, and records the compressed signal onto the recording medium 304.

The high pass filter 306 extracts a high frequency component of the supplied high resolution video signal and transmits it to a high frequency coding circuit 307. The high frequency coding circuit 307 compresses an information amount of the supplied signal and sends it to the additional information coding circuit 308. The additional information coding circuit 308 encodes the additional information signal supplied from the additional information input terminal 309 and the signal supplied from the high frequency coding circuit 307 and records the encoded signals to the recording medium 304.

An audio signal which is supplied to the audio signal input terminal 310 is encoded by the audio coding circuit 311 and recorded onto the recording medium 304.

As a result of the above processes, each code is stored into each storage area of every frame on the recording medium 304 in a form as shown in a column (b) in FIG. 4.

Discrimination information to discriminate whether the low resolution video image has been supplied to the video input terminal 301 or the high resolution video image has been supplied is supplied from the additional information input terminal 309 and recorded onto the recording medium 304. By recording the discrimination information every frame, the low resolution video signal (motion image) and the high resolution video signal (still image) can be allowed to exist together on the same recording medium.

It is also possible to construct such that when the still image is inputted, the coding data outputted from the low resolution video coding circuit 303 is continuously stored into an image storage area on the recording medium by an amount corresponding to a plurality of frames, and the coding data outputted from the high frequency coding circuit 307 is divided and recorded into an additional information storage area of those plurality of frames.

Figure 5:
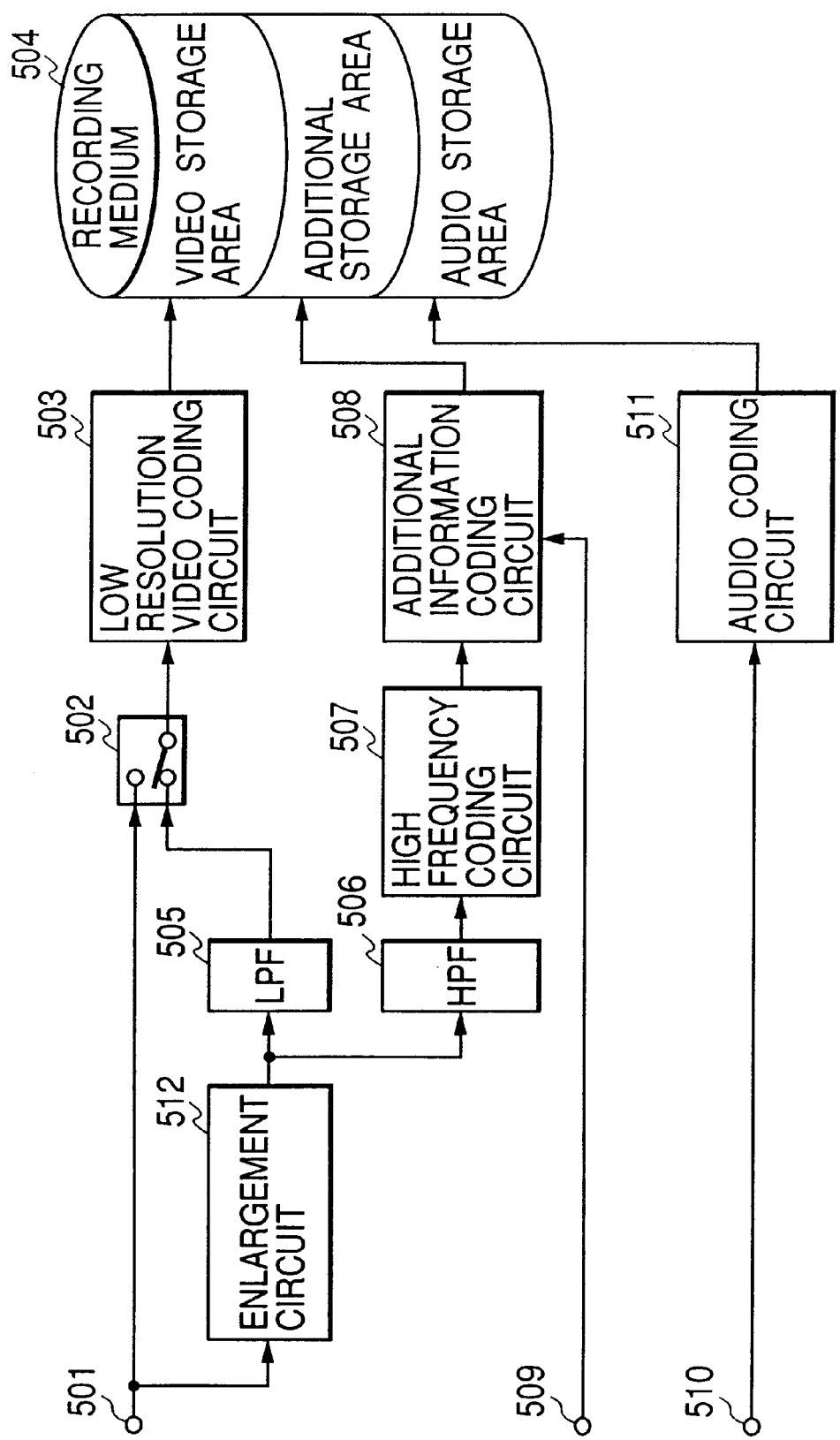
FIG. 5 is a block diagram of a coding apparatus of the second embodiment according to the invention.

FIG. 5 is a block diagram of a coding apparatus of the second embodiment according to the invention. The embodiment relates to an apparatus which can input high resolution still images as many as the number of plural kinds of pixels.

First, the case where a low resolution video signal (motion image) is inputted to a video input terminal 501 will be described.

A low resolution video signal supplied to the video input terminal 501 is sent to a low resolution video coding circuit 503 via a switching circuit 502. The low resolution video coding circuit 503 performs processes such as orthogonal transformation, quantization, and variable length coding to the supplied video signal, compresses an information amount thereof, and records the compressed signal onto a recording medium 504.

An additional information signal which is supplied to an additional information input terminal 509 and an audio signal which is supplied to an audio signal input terminal 510 are transmitted to an additional information coding circuit 508 and an audio coding circuit 511 and encoded. After that, the encoded signals are recorded onto the recording medium 504.

That is, the processes which are executed to the low resolution video signal are substantially the same as those in the first embodiment.

The case where a video signal (still image) of a high resolution is inputted to the video input terminal 501 will now be described.

The high resolution video signal supplied to the video input terminal 501 is sent to an enlargement circuit 512. The enlargement circuit 512 performs an enlarging process to the video signal comprising plural kinds of pixels which are supplied, thereby converting it to the single number of pixels. That is, even if the number of pixels of one frame of the supplied high resolution video signal is equal to (1280×960), (1152×864), or (1024×768), all of the images are enlarged to the predetermined number of pixels, for example, (1440×960) pixels by the enlargement circuit 512, thereby allowing the subsequent processes to be unitedly performed.

The video signal enlarged by the enlargement circuit 512 is supplied to a low pass filter 505 and a high pass filter 506. The low pass filter 505 extracts a low frequency component of the supplied high resolution video signal, converts it into the low resolution video signal having the same number of pixels as that of the low resolution video signal (motion image), and supplies it to the switching circuit 502.

The switching circuit 502 transmits the video signal supplied from the low pass filter 505 to the low resolution video coding circuit 503. The low resolution video coding circuit 503 performs processes such as orthogonal transformation, quantization, and variable length coding to the supplied video signal, compresses an information amount, and records the compressed video signal onto the recording medium 504.

The high pass filter 506 extracts a high frequency component of the supplied high resolution video signal and supplies it to a high frequency coding circuit 507. The high frequency coding circuit 507 compresses an information amount of the supplied signal and transmits it to the additional information coding circuit 508. The additional information coding circuit 508 encodes an additional information signal supplied from the additional information input terminal 509 and a signal supplied from the high frequency coding circuit 507 and records the coded signals onto the recording medium 504.

An audio signal which is supplied to the audio signal input terminal 501 is encoded by the audio coding circuit 511 and recorded onto the recording medium 504.

Discrimination information to discriminate whether the low resolution video image has been supplied to the video input terminal 501 or the high resolution video image has been supplied and the pixel number information of the high resolution video image are supplied from the additional information input terminal 509 and recorded onto the recording medium 504. By recording the discrimination information every frame, the low resolution motion image and the high resolution still image can be allowed to exist together on the same recording medium.

Figure 6:
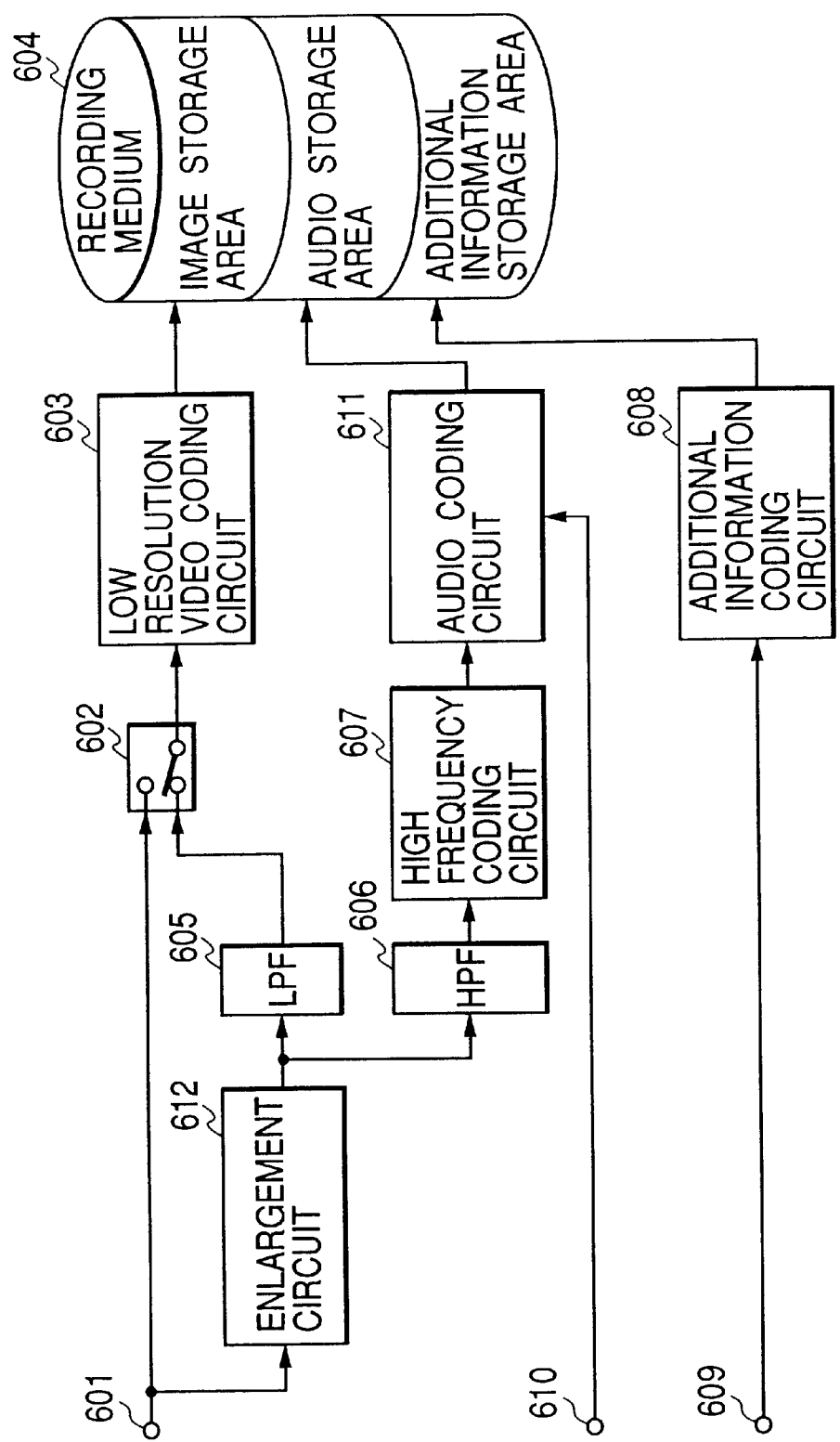
FIG. 6 is a block diagram of a coding apparatus of the third embodiment according to the invention.

FIG. 6 is a block diagram of a coding apparatus of the third embodiment according to the invention.

First, the case where a low resolution video signal (motion image) is inputted to a video input terminal 601 will now be described.

A low resolution video signal supplied to the video input terminal 601 is sent to a low resolution video coding circuit 603 via a switching circuit 602. The low resolution video coding circuit 603 performs processes such as orthogonal transformation, quantization, and variable length coding to the supplied video signal, compresses an information amount thereof, and records the compressed signal onto a recording medium 604.

An additional information signal which is supplied to an additional information input terminal 609 and an audio signal which is supplied to an audio signal input terminal 610 are transmitted to an additional information coding circuit 608 and an audio coding circuit 611 and encoded and, after that, the encoded signals are recorded onto the recording medium 604.

The case where a video signal (still image) of a high resolution is inputted to the video input terminal 601 will now be described.

The high resolution video signal supplied to the video input terminal 601 is sent to an enlargement circuit 612. The enlargement circuit 612 performs an enlarging process to the video signal comprising plural kinds of pixels which are supplied, thereby converting it to the single number of pixels (similar to the enlargement circuit 512 in the second embodiment).

The video signal enlarged by the enlargement circuit 612 is supplied to a low pass filter 605 and a high pass filter 606. The low pass filter 605 extracts a low frequency component of the supplied high resolution video signal, converts it into the low resolution video signal having the same number of pixels as that of the low resolution video signal (motion image), and supplies it to the switching circuit 602.

The switching circuit 602 transmits the video signal supplied from the low pass filter 605 to the low resolution video coding circuit 603. The low resolution video coding circuit 603 performs processes such as orthogonal transformation, quantization, and variable length coding to the video signal, compresses an information amount, and records the compressed video signal onto the recording medium 604.

The high pass filter 606 extracts the high frequency component of the supplied high resolution video signal and sends it to a high frequency coding circuit 607. The high frequency coding circuit 607 compresses an information amount of the supplied signal and sends the compressed signal to the audio coding circuit 611. The audio coding circuit 611 encodes the signal supplied from the high frequency coding circuit 607 and records the coded signal into a part or all of an area for audio recording on the recording medium 604 in accordance with the information amount.

That is, when the information amount is large, four channels as the total number of channels of the audio recording area are used to record the high frequency component. When the information amount is small, only two channels are used to record the high frequency component.

Additional information which is supplied to the additional information input terminal 609 is encoded by the additional information coding circuit 608 and recorded onto the recording medium 604.

As a result of the above processes, each code is stored in each storage area of every frame on the recording medium 604 in a form as shown in a column (c) in FIG. 4.

Discrimination information to discriminate whether the low resolution video image has been supplied to the video input terminal 601 or the high resolution video image has been supplied and the pixel number information of the high resolution video image are supplied from the additional information input terminal 609 and recorded onto the recording medium 604. By recording the discrimination information every frame, the low resolution motion image and the high resolution still image can be allowed to exist together on the same recording medium.

Each of the coding apparatus according to the second and third embodiments described above is a coding apparatus for storing the encoded motion image signal constructed by (n×m) pixels into the motion image storage area on the recording medium.

In the coding apparatus, the low pass filter receives a still image signal constructed by (N×M) pixels (N>n, M>m), extracts the still image signal of (n×m) pixels corresponding to the low frequency component of the received image signal, and supplies it to the low resolution video coding circuit. The low resolution video coding circuit encodes the extracted still image signal of (n×m) pixels and continuously stores the encoded image signal as many as k (k>0) frames into the motion image storage area on the recording medium.

The high pass filter extracts a high frequency component of the still image signal constructed by (N×M) pixels. The high frequency coding circuit encodes the extracted high frequency component and stores it into a storage area different from the image storage area on the recording medium.

The enlargement circuit receives a video signal constructed by (i×j) pixels (i>n, j>m), enlarges the video signal to (N×M) pixels (N≧i, M≧j), and supplies the enlarged signal to the low pass filter and the high pass filter.

The high pass filter may extract a signal train LH constructed by a low frequency component in the horizontal direction and a high frequency component in the vertical direction, a signal train HL comprising a high frequency component in the horizontal direction and a low frequency component in the vertical direction, and a signal train HH comprising a high frequency component in the horizontal direction and a high frequency component in the vertical direction in the video signal comprising (N×M) pixels.

Further, the high pass filter may extract the high frequency component as n×(M−m) information trains, (N−n)×m information trains, and (N−n)×(M−m) information trains.

The values of N and M may be set to (N=2×n, M=2×m).

The discrimination information shows whether the signal extracted from the still image signal comprising (N×M) pixels has been stored or not. The discrimination information is stored onto the recording medium.

The coding output of the high frequency coding circuit is stored into a subcode storage area or a video auxiliary data storage area in the additional information storage area on the recording medium.

A decoding process for decoding the video signal recorded by the foregoing processes will now be described.

Figure 7:
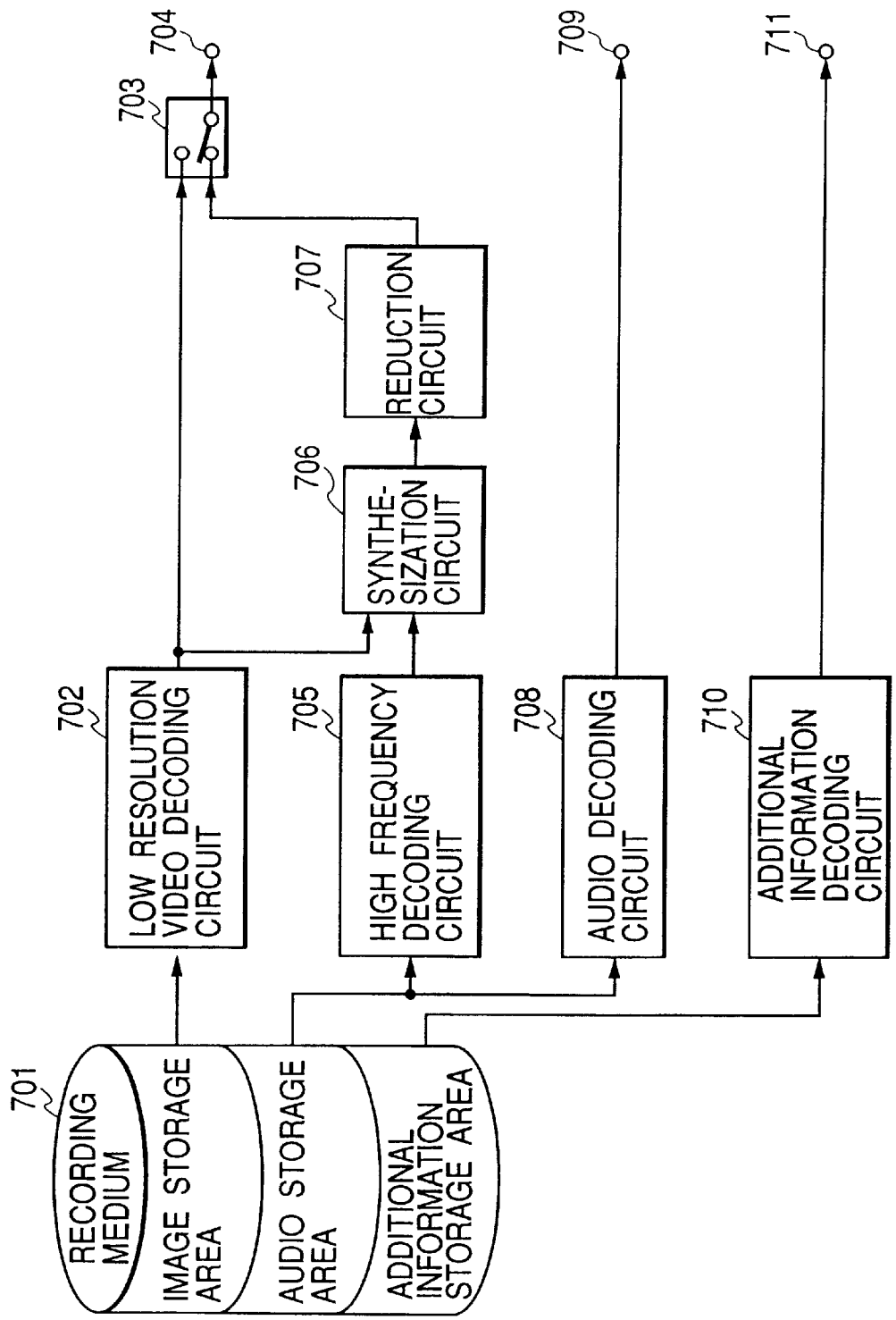
FIG. 7 is a block diagram of a decoding apparatus of the embodiment according to the invention.

FIG. 7 is a block diagram of a decoding apparatus of the embodiment according to the invention.

First, the case where the normal low resolution video signal (motion image) has been stored on a recording medium 701 by the third embodiment will be described. That is, the codes have been stored in each storage area of every frame on the recording medium 701 in the form as shown in the column (a) in FIG. 4.

A low resolution video code recorded in the image storage area on the recording medium 701 is supplied to a low resolution video decoding circuit 702 and subjected to processes such as variable length decoding, inverse quantization, and inverse orthogonal transformation. The processed code is sent to a switching circuit 703.

The switching circuit 703 outputs a video signal supplied from the low resolution video decoding circuit 702 to a video signal output terminal 704. An audio code recorded in an audio storage area on the recording medium 701 is supplied to an audio decoding circuit 708, decoded to an audio signal, and outputted from an audio output terminal 709. Further, additional information recorded in an additional information storage area on the recording medium is supplied to an additional information decoding circuit 710, decoded to additional information, and outputted from an additional information output terminal 711.

The case where the high resolution video signal (still image) has been stored on the recording medium 701 by the third embodiment will now be described. The codes have been stored in each storage area of every frame on the recording medium 701 in the form as shown in the column (c) in FIG. 4.

A low frequency code recorded on the recording medium 701 is supplied to the low resolution video decoding circuit 702 and subjected to processes such as variable length decoding, inverse quantization, and inverse orthogonal transformation. The processed code is supplied to a synthesization circuit 706.

A high frequency code recorded in an audio storage area on the recording medium 701 is supplied to a high frequency decoding circuit 705 and an audio code is supplied to the audio decoding circuit 708, respectively. The high frequency decoding circuit 705 decodes the supplied high frequency code and transmits it to the synthesization circuit 706. The audio decoding circuit 708 decodes the supplied audio code and outputs it to the audio output terminal 709.

The synthesization circuit 706 synthesizes the low frequency component supplied from the low resolution video decoding circuit 702 and the high frequency component supplied from the high frequency decoding circuit 705, forms a high resolution video signal (still image), and supplies it to a reduction circuit 707. The reduction circuit 707 reduces the supplied high resolution video signal to the signal of the number of pixels before the encoding and outputs the reduced signal to the video signal output terminal 704 via the switching circuit 703.

An additional information code recorded in the additional information storage area on the recording medium 701 is supplied to the additional information decoding circuit 710, decoded to the additional information, and outputted to additional information output terminal 711.

The decoding apparatus described above is a decoding apparatus for decoding a video code stored in an image storage area on the recording medium and outputting a motion image signal comprising (n×m) pixels.

In the decoding apparatus, the low resolution video decoding circuit decodes the video code stored in the image storage area in k (k>0) frames on the recording medium into a low frequency component. The high frequency decoding circuit decodes a high frequency code extracted from a storage area different from the image storage area in the k frames into a high frequency component. The synthesization circuit synthesizes the decoded low and high frequency components and outputs a still image signal comprising (N×M) pixels (N>n, M>m).

Figure 8:
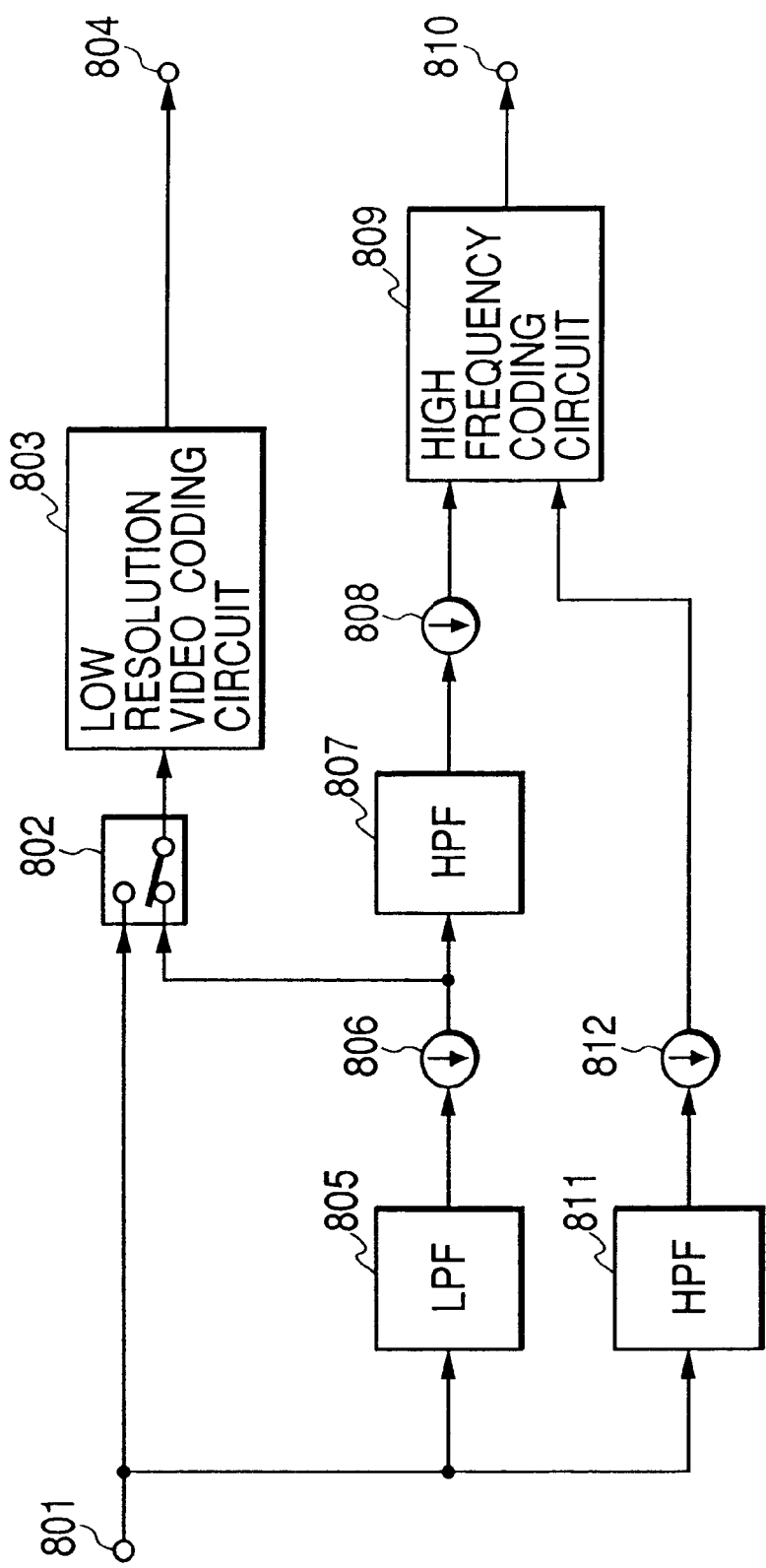
FIG. 8 is a block diagram of a coding apparatus of the fourth embodiment according to the invention.

FIG. 8 is a block diagram of a coding apparatus of the fourth embodiment according to the invention. Coding process of a low resolution video image First, the case where a low resolution video signal (motion image) is inputted to a video input terminal 801 will be described.

The low resolution video signal supplied to the video input terminal 801 is supplied to a low resolution video coding circuit 803 via a switching circuit 802. The low resolution video coding circuit 803 performs processes such as orthogonal transformation, quantization, and variable length coding to the low resolution video signal, thereby converting it into a low resolution video code. The converted code is outputted to a low resolution video code output terminal 804.

Coding Process of a High Resolution Video Image

Subsequently, the case where a high resolution video signal (still image) is inputted to the video input terminal 801 will be described.

The high resolution video signal supplied to the video input terminal 801 is transmitted to a low pass filter 805 and a high pass filter 811. The high resolution video signal is divided into a low frequency signal and a high frequency signal by the low pass filter 805 and high pass filter 811 and supplied to down-samplers 806 and 812, respectively.

Figure 9A:
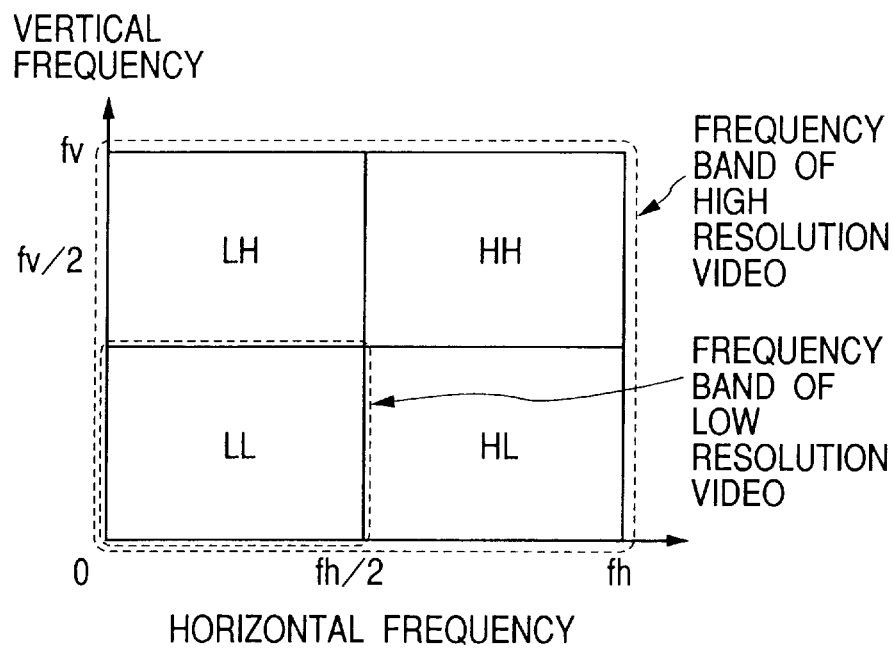
FIGS. 9A and 9B are diagrams showing states of frequency division in the fourth and fifth embodiments according to the invention.

FIG. 9A shows an example of the frequency division by the low pass filter 805 and high pass filter 811.

The low pass filter 805 allows a two-dimensional frequency area LL in the diagram, namely, only the half low band of the high resolution video signal in both of the horizontal and vertical directions to pass. The high pass filter 811 allows only LH, HL, and HH areas in the diagram to pass.

The down-sampler 806 thins out the low frequency signal supplied from the low pass filter 805 into the half in both of the horizontal and vertical directions, thereby converting the signal into a low resolution video image of the same number of pixels as that of the low resolution video image which can be inputted in the embodiment. After that, the converted low resolution video image is supplied to the switching circuit 802 and a high pass filter 807. The switching circuit 802 selects the low resolution video image supplied from the down-sampler 806 and transmits it to the low resolution video coding circuit 803.

The low resolution video coding circuit 803 performs processes such as orthogonal transformation, quantization, and variable length coding to the low resolution video code, thereby converting it into a low resolution video code and outputting it to the low resolution video code output terminal 804.

Figure 9B:
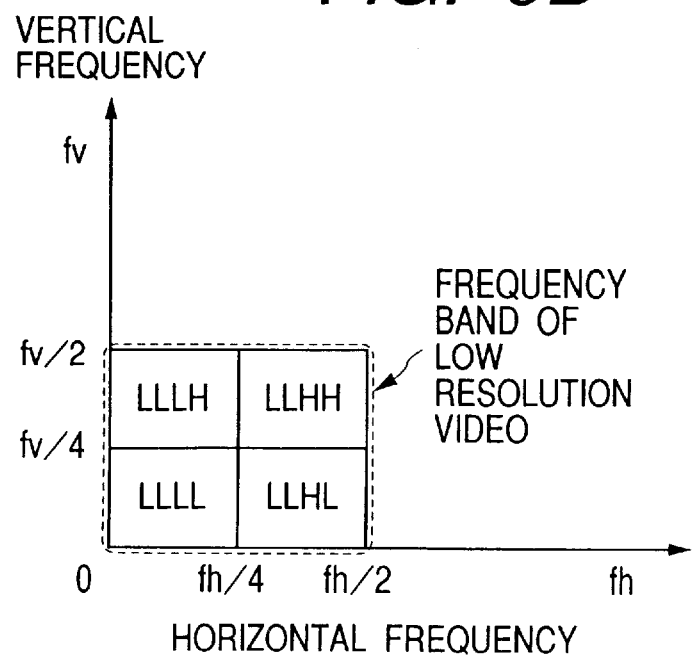

The high pass filter 807 supplies only the high frequency component of the low resolution video image supplied from the down-sampler 806 to a down-sampler 808. FIG. 9B shows an example of a high frequency component which is allowed to pass by the high pass filter 807. That is, only areas shown by LLLH, LLHL, and LLHH in the diagram are supplied to the down-sampler 808.

The down-samplers 812 and 808 thins out the supplied signal trains into the half in both of the horizontal and vertical directions in each area and supply the thined-out signal trains to a high frequency coding circuit 809. The high frequency coding circuit 809 performs processes such as quantization and variable length coding to the supplied signal, thereby converting it into a high frequency code and outputting it to a high frequency code output terminal 810.

According to the embodiment as described above, when the high resolution video signal is inputted, its low frequency component (LL) and high frequency components (LH, HL, HH) are extracted, the high frequency components (LLLH, LLHL, LLHH) are further extracted from the low frequency component (LL), and they are encoded, respectively. Therefore, when the high resolution video image is encoded, a higher picture quality than that in case of encoding the low frequency component (LL) as it is is realized.

As for the encoding of the low resolution video image corresponding to the low frequency component, since general processes are executed, a compatibility with the conventional apparatus can be maintained.

Since an information amount of the high frequency components (LLLH, LLHL, LLHH) which are extracted from the low frequency component (LL) in the embodiment is relatively small, a coding efficiency is not largely deteriorated.

Coding data outputted from the low resolution video code output terminal 804 and high frequency code output terminal 810 is recorded into predetermined recording areas on the recording medium by processes similar to those in the first to third embodiments.

A decoding process of the video signal encoded by the foregoing coding process will now be described.

Figure 10:
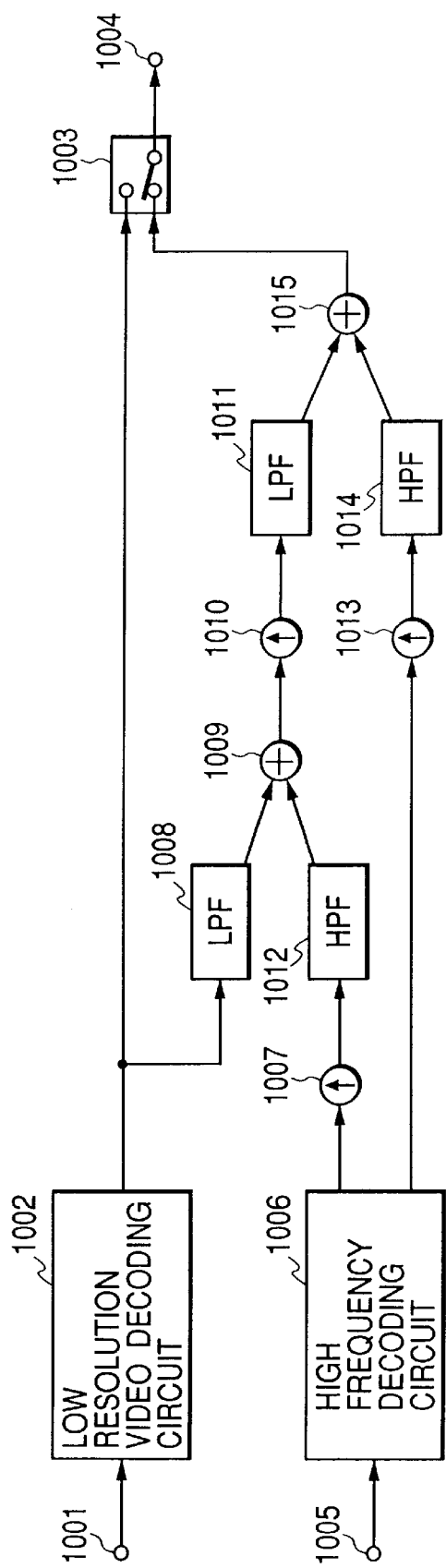
FIG. 10 is a block diagram of a decoding apparatus corresponding to the coding apparatus of the fourth embodiment according to the invention.

FIG. 10 is a block diagram of a decoding apparatus in the fourth embodiment according to the invention.

Decoding Process of a Low Resolution Video Image

First, the case where a code of the low resolution video image encoded by the foregoing coding apparatus is supplied will be described.

The low resolution video code which is supplied to a low resolution video code input terminal 1001 is supplied to a low resolution video decoding circuit 1002 and subjected to processes such as variable length decoding, inverse quantization, and inverse orthogonal transformation, so that it is converted into a video code. After that, the video code is supplied to a switching circuit 1003.

The switching circuit 1003 outputs the video signal supplied from the low resolution video decoding circuit 1002 to a video signal output terminal 1004.

Decoding Process of a High Resolution Video Image

Subsequently, the case where a code of the high resolution video image encoded by the foregoing coding apparatus is supplied will be described.

In this case, a video code corresponding to the frequency band LL shown in FIG. 9A is first supplied to the low resolution video code input terminal 1001. The low resolution video decoding circuit 1002 performs processes such as variable length decoding, inverse quantization, and inverse orthogonal transformation to the supplied video code, thereby decoding the low resolution video image and supplying it to a low pass filter 1008. The low pass filter 1008 transmits a low frequency signal of the supplied low resolution video image, namely, the signal corresponding to the frequency band LLLL shown in FIG. 9B to an addition circuit 1009.

A high frequency code which is supplied to a high frequency code input terminal 1005 is sent to a high frequency decoding circuit 1006. The high frequency code which is inputted here corresponds to the areas of the frequency bands LH, HL, and HH shown in FIG. 9A and the frequency bands LLLH, LLHL, and LLHH shown in FIG. 9B when the high resolution video image is encoded. The high frequency decoding circuit 1006 performs processes such as variable length decoding and inverse quantization to the high frequency code, supplies the signal train corresponding to the frequency bands LH, HL, and HH to an up-sampler 1013, and supplies the signal train corresponding to the frequency bands LLLH, LLHL, and LLHH to an up-sampler 1007, respectively.

The up-samplers 1007 and 1013 insert a "0" value in the horizontal and vertical directions to the supplied signal trains and transmit the resultant signal trains to high pass filters 1012 and 1014, respectively. The high pass filter 1012 allows only the frequency bands LLLH, LLHL, and LLHH shown in FIG. 9B in the supplied signal train to pass and supplies them to the addition circuit 1009. The addition circuit, 1009 adds the supplied bands LLLH, LLHL, and LLHH and the band LLLL supplied from the low pass filter 1008, thereby reconstructing the band LL shown in FIG. 9A and transmitting it to an up-sampler 1010.

The up-sampler 1010 inserts a "0" value in the horizontal and vertical directions to the supplied signal train and sends the resultant signal train to a low pass filter 1011. The low pass filer 1011 allows only the band LL shown in FIG. 9A in the signal train supplied from the up-sampler 1010 to pass and transmits it to an addition circuit 1015. The high pass filter 1014 allows only the bands LH, HL, and HH shown in FIG. 9A in the signal train supplied from the up-sampler 1013 to pass and sends them to the addition circuit 1015. The addition circuit 1015 adds the supplied band LL and bands LH, HL, and HH, thereby reconstructing the whole band of the high resolution video image and supplying it to the switching circuit 1003.

The switching circuit 1003 selects the signal supplied from the addition circuit 1015 and outputs it to the video signal output terminal 1004.

According to the fourth embodiment as described above, the high frequency video signal can be encoded/decoded while the compatibility with the conventional decoding apparatus is held.

The fourth embodiment has been described with respect to the example in which when the high resolution video image is decoded, by adding the band LL and the bands LH, HL, and HH by the addition circuit 1015, the whole band of the high resolution video image is reconstructed and outputted to the switching circuit 1003. By constructing so as to output only the band LL to the switching circuit 1003 instead of performing the addition, a low resolution video image of a high picture quality can be outputted.

Although the fourth embodiment has been described with respect to the example of separating the low resolution video code and the high frequency code and inputting and outputting them, it is also possible to use a construction such that the signal obtained by multiplexing them is inputted and outputted. As a multiplexing method in this case, for example, a method of time-divisionally multiplexing the low resolution video code and the high frequency code, a method of frequency multiplexing them, or the like can be applied.

Figure 11:
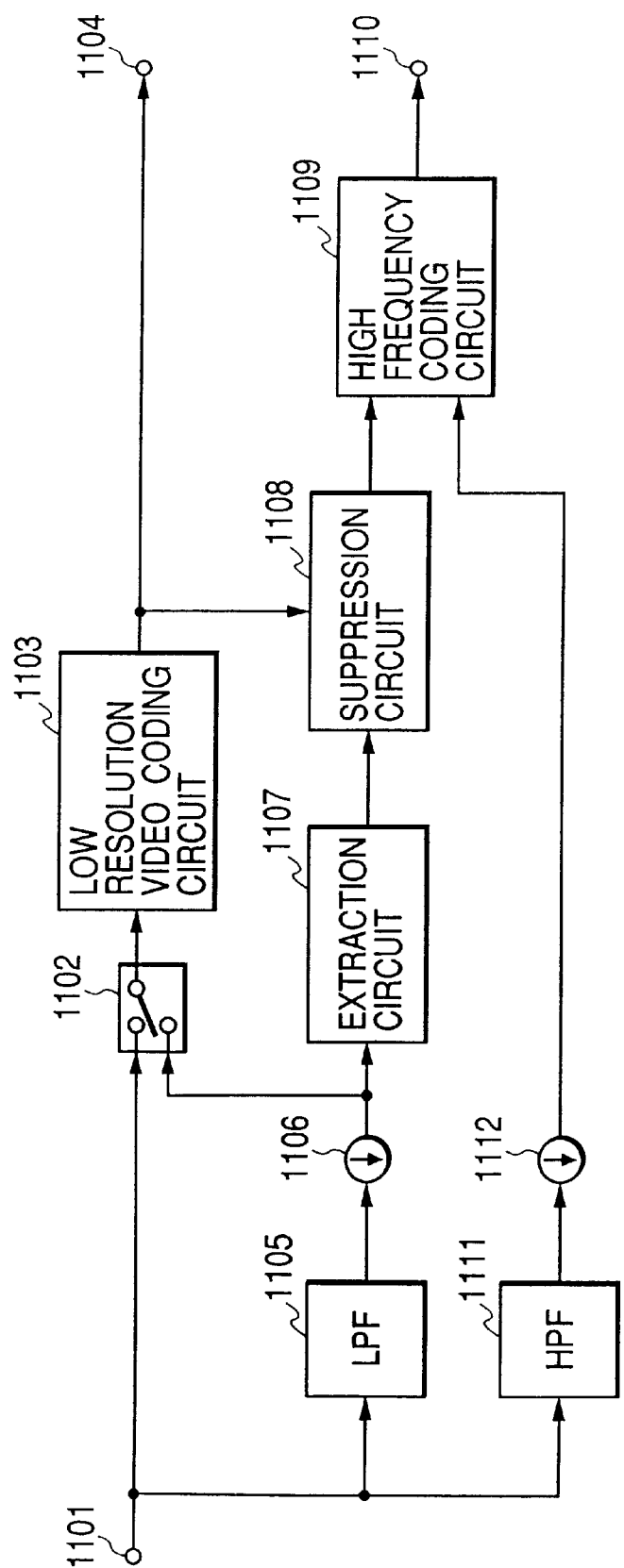
FIG. 11 is a block diagram of a coding apparatus of the fifth embodiment according to the invention.

FIG. 11 is a block diagram of a coding apparatus according to the fifth embodiment of the invention.

The case where a low resolution video image is inputted to a video input terminal 1101 will be first described. The low resolution video signal supplied to the video input terminal 1101 is sent to a low resolution video coding circuit 1103 via a switching circuit 1102.

Figure 12:
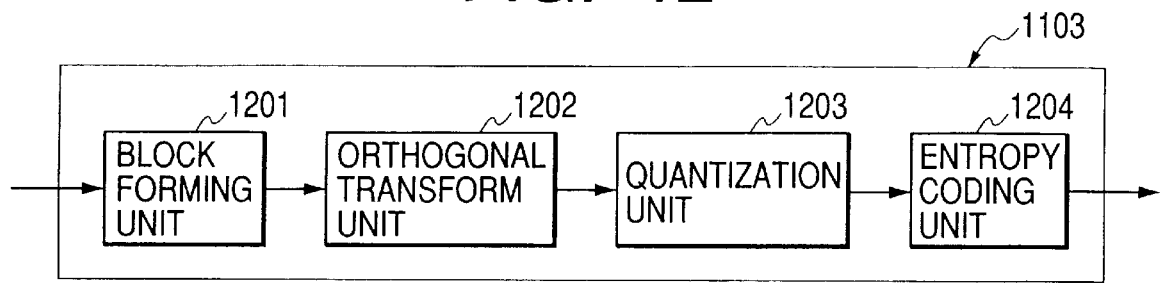
FIG. 12 is a block diagram of a low resolution video coding circuit 1103.

As shown in FIG. 12, the low resolution video coding circuit 1103 comprises: a block forming unit 1201; an orthogonal transform unit 1202; a quantization unit 1203; and an entropy coding unit 1204. The coding circuit 1103 forms a block every predetermined area from the low resolution video signal, performs an orthogonal transformation to the signal on a block unit basis, thereby quantizing a transformation coefficient, and encoding. The low resolution video coding circuit 1103 generates the code to an output terminal 1104.

The quantization unit 1203 divides the orthogonal transformation coefficient supplied on a block unit basis from the orthogonal transformation unit 1202 by a divisor according to a quantization parameter and supplies a resultant value to the entropy coding unit 1204. The divisor is a positive integer of 1 or more. As the divisor has a larger value, deterioration of the picture quality due to the encoding is likely to occur. In the block area where "1" is selected as a divisor, the deterioration in the picture quality in association with the coding is extremely small.

The case where a high resolution video image is inputted to the video input terminal 1101 will now be described. In the embodiment, it is assumed that the high resolution video image comprises pixels of the number that is twice as large as that of the low resolution video image in both of the horizontal and vertical directions. That is, when the low resolution video image comprises (n×m) pixels, the high resolution video image comprises (N×M) pixels (N=2n, M=2m).

A high resolution video signal supplied to the video input terminal 1101 is transmitted to a low pass filter 1105 and a high pass filter 1111.

The high resolution video signal is frequency divided into a low frequency signal and a high frequency signal by the low pass filter 1105 and high pass filter 1111 and supplied to down-samplers 1106 and 1112, respectively.

FIG. 9A shows an example of the frequency division by the low pass filter 1105 and high pass filter 1111. The low pass filter 1105 allows the two-dimensional frequency area LL in FIG. 9A, namely, only the half low bands of the high resolution video signal in both of the horizontal and vertical directions to pass.

The high pass filter 1111 allows only the LH, HL, and HH areas in FIG. 9A to pass.

The down-sampler 1112 thins out the signal train supplied from the high pass filter 1111 into the half in each area in both of the horizontal and vertical directions and supplies the thinned-out signal train to a high frequency coding circuit 1109.

The down-sampler 1106 thins out the low frequency signal supplied from the low pass filter 1105 into the half in both of the vertical and horizontal directions, thereby converting it into a low resolution video image of the same number of pixels as that of the low resolution video image and supplying the converted video image to the switching circuit 1102 and an extraction circuit 1107.

The switching circuit 1102 selects the low frequency signal supplied from the down-sampler 1106 and sends it to the low resolution video coding circuit 1103. The low resolution video coding circuit 1103 performs processes such as block formation, orthogonal transformation, quantization, and entropy coding to the supplied low frequency signal, thereby coding the low frequency signal and supplying the resultant code to the output terminal 1104 and a suppression circuit 1108.

The extraction circuit 1107 extracts a signal to reinforce the deterioration in coding from the low resolution video signal supplied from the down-sampler 1106 and transmits the extracted signal to the suppression circuit 1108. Processes in the extraction circuit 1107 will now be specifically explained with reference to FIG. 13. The extraction circuit 1107 extracts the high frequency component which is remarkably deteriorated upon encoding of the low resolution video image as a signal for reinforcement.

Figure 13:
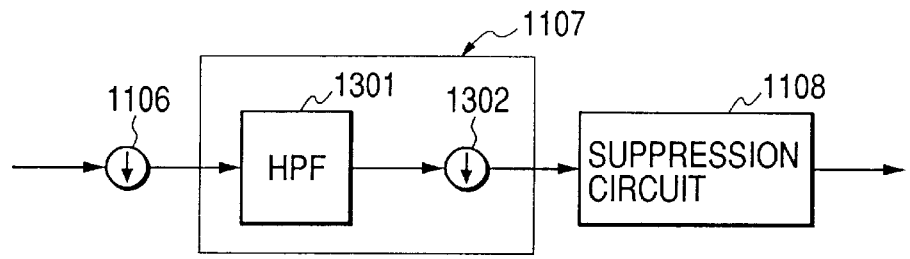
FIG. 13 is a block diagram of an extraction circuit 1107.

In FIG. 13, the extraction circuit 1107 comprises a high pass filter 1301 and a down-sampler 1302. The high pass filter 1301 extracts a high frequency component of the low frequency signal supplied from the down-sampler 1106 and sends it to the down-sampler 1302.

The high frequency component corresponds to the components except for the lowest frequency component among the components obtained by dividing the low frequency signal into four signals and relates to the components of the areas of LLLH, LLHL, and LLHH shown in FIG. 9B.

The down-sampler 1302 thins out the signal train regarding the supplied high frequency component into the half in each area in both of the horizontal and vertical directions and supplies the thinned-out signal train to the suppression circuit 1108.

The suppression circuit 1108 suppresses the high frequency signal extracted by the extraction circuit 1107 in accordance with the code of the low frequency signal supplied from the low resolution video coding circuit 1103 and transmits the suppressed signal to the high frequency coding circuit 1109. Processes of the suppression circuit 1108 will now be specifically explained with reference to FIG. 14.

Figure 14:
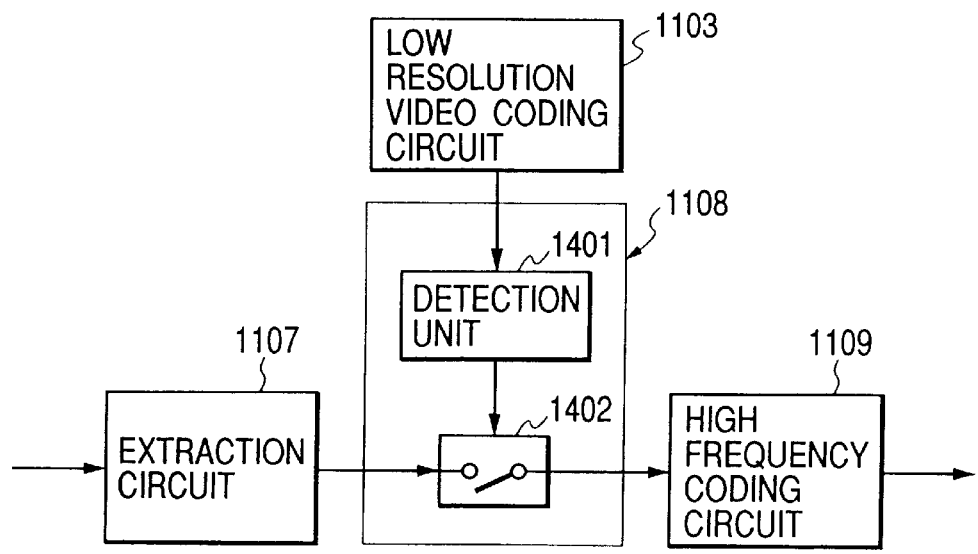
FIG. 14 is a block diagram of a suppression circuit 1108.

In FIG. 14, the suppression circuit 1108 comprises a detection unit 1401 and a selection unit 1402. The detection unit 1401 takes out a quantization parameter included in the code train which is supplied from the low resolution video coding circuit 1103 and supplies a control signal corresponding to the parameters to the selection unit 1402.

The selection unit 1402 selectively transmits the high frequency signal supplied from the extraction circuit 1107 to the high frequency coding circuit 1109 in response to the control signal. In the embodiment, since it is considered that deterioration in picture quality is within an allowable range for the block area in which the divisor of the quantization shown by the quantization parameter is equal to or less than a predetermined value, the supply of the high frequency signal to the high frequency coding circuit 1109 is shut off.

Since it is considered that the deterioration in picture quality which cannot be permitted occurs in the block area where the divisor of the quantization exceeds the predetermined value, the high frequency signal of the corresponding area is supplied as a reinforcement signal to the high frequency coding circuit 1109.

As for the suppression circuit 1108, a similar effect can be obtained even by performing processes such that the necessity of the suppression is detected on the basis of an amount of code information of a block unit in place of the divisor of the quantization and the reinforcement signal (high frequency signal) to be suppressed is replaced to the invalid value. The necessity of the suppression can be detected on the basis of activity information of an image.

Finally, the high frequency coding circuit 1109 encodes the high frequency signal of the high resolution video image supplied from the high pass filter 1111 and the high frequency signal in the low frequency signal of the high resolution video image supplied from the suppression circuit 1108, forms a high frequency code, and outputs it to a high frequency code output terminal 1110.

The codes which are outputted from the output terminals 1104 and 1110 are received on the receiving sides, and decoded, respectively.

Like the first to third embodiments, the coding data outputted from the output terminals 1104 and 1110 can be recorded into predetermined areas on the recording medium.

Figure 15:
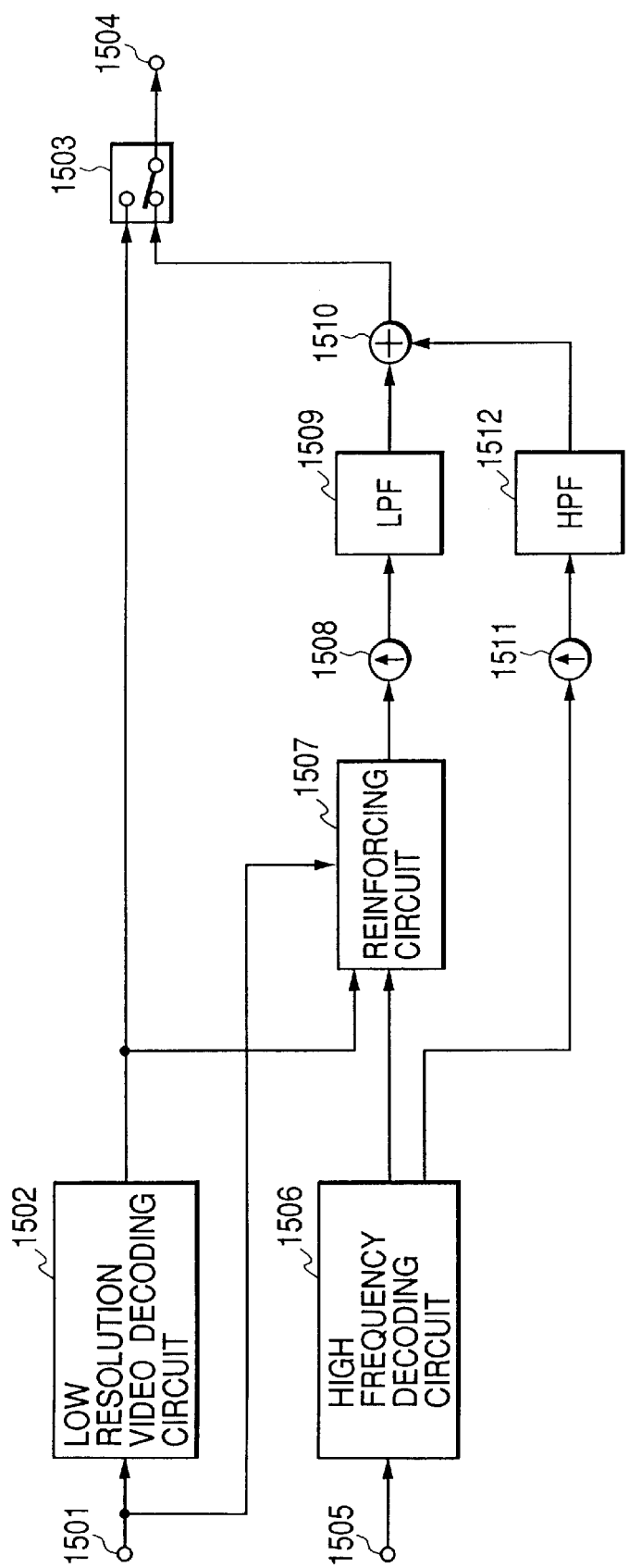
FIG. 15 is a block diagram of a decoding apparatus corresponding to the coding apparatus of the fifth embodiment according to the invention.

A decoding apparatus corresponding to the foregoing coding apparatus will now be described. FIG. 15 is a block diagram of such a decoding apparatus.

In FIG. 15, the high efficient decoding apparatus comprises: an input terminal 1501 of a low resolution video code; a low resolution video decoding circuit 1502; a switching circuit 1503; a video signal output terminal 1504; an input terminal 1505 of a high frequency code; a high frequency decoding circuit 1506; a reinforcing circuit 1507; an up-sampler 1508; a low pass filter 1509; an addition circuit 1510; an up-sampler 1511; and a high pass filter 1512. By connecting the input terminals 1501 and 1505 to the output terminals 1104 and 1110 of the foregoing high efficient coding apparatus mentioned above via proper transmission path, respectively, the code can be transmitted. The switching circuit 1503 connects the video signal output terminal 1504 and low resolution video decoding circuit 1502 when a code regarding a low resolution video image is inputted. The switching circuit 1503 connects the video signal output terminal 1504 and addition circuit 1510 when a code regarding a high resolution video image is inputted.

The operation of the high efficient decoding apparatus with the above construction will be described. First, the case where the code of the low resolution video image encoded by the high efficient coding apparatus is inputted will be explained.

The low resolution video code which is supplied to the low resolution video code input terminal 1501 is supplied to the low resolution video decoding circuit 1502 and subjected to processes such as entropy decoding, inverse quantization, inverse orthogonal transformation, and rasterization to the supplied code. The decoded video signal is supplied to the switching circuit 1503 and outputted to the video signal output terminal 1504.

The case where the code of the high resolution video image encoded by the high efficient coding apparatus is supplied will now be described.

A video code which is supplied to the input terminal 1501 corresponds to the signal of the frequency band LL in FIG. 9A. The low resolution video decoding circuit 1502 performs processes such as entropy decoding, inverse quantization, inverse orthogonal transformation, and rasterization to the video code supplied from the input terminal 1501, thereby decoding it into the low resolution video image and supplying the decoded image to the reinforcing circuit 1507.

The high frequency code which is supplied to the input terminal 1505 is sent to the high frequency decoding circuit 1506. The high frequency code is a code obtained by encoding the signals in the frequency bands LH, HL, and HH in FIG. 9A and the frequency bands LLLH, LLHL, and LLHH in FIG. 9B when the high resolution video image is encoded.

The high frequency decoding circuit 1506 performs processes such as entropy decoding and inverse quantization to the high frequency code, supplies the signal train corresponding to the frequency bands LLLH, LLHL, and LLHH to the reinforcing circuit 1507, and supplies the signal train corresponding to the frequency bands LH, HL, and HH to the up-sampler 1511.

Figure 16:
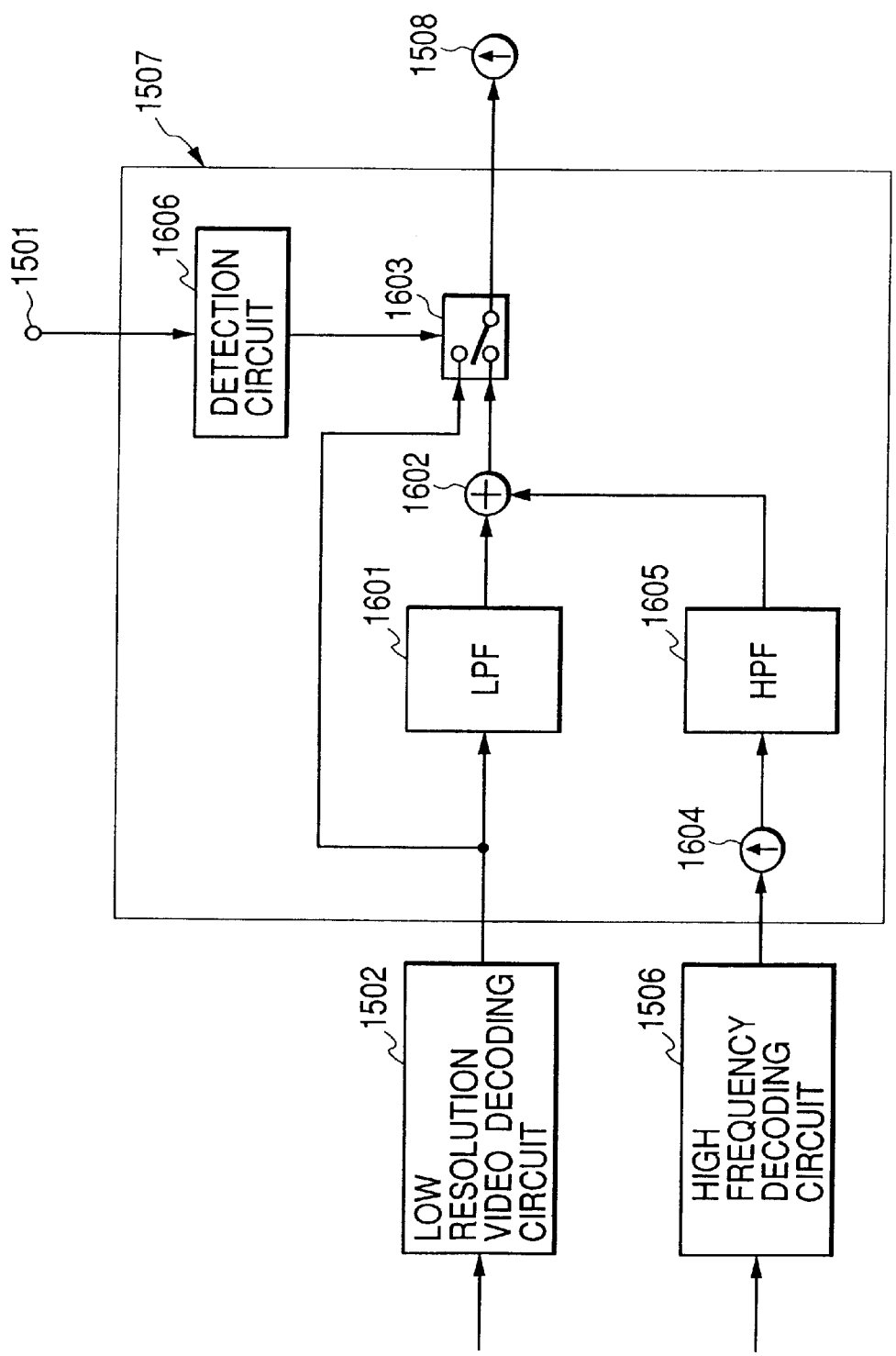
FIG. 16 is a block diagram of a reinforcing circuit 1507.

The reinforcing circuit 1507 reinforces the deterioration included in the signal supplied from the low resolution video decoding circuit 1502 by the signal supplied from the high frequency decoding circuit 1506 and transmits the reinforced signal to the up-sampler 1508. FIG. 16 is a block diagram of the reinforcing circuit 1507.

In FIG. 16, the reinforcing circuit 1507 comprises: a low pass filter 1601; an addition circuit 1602; a switching circuit 1603; an up-sampler 1604; a high pass filter 1605; and a detection circuit 1606.

The low pass filter 1601 extracts the low frequency signal of the supplied low resolution video image, namely, the frequency band LLLL in FIG. 9B and sends it to the addition circuit 1602. The up-sampler 1604 inserts a "0" value into the supplied signal train in the horizontal and vertical directions and transmits the resultant signal train to the high pass filer 1605.

The high pass filter 1605 allows only the components of the bands LLLH, LLHL, and LLHH in FIG. 9B in the supplied signal train to pass and supplies them to the addition circuit 1602.

The addition circuit 1602 adds the supplied signal of the bands LLLH, LLHL, and LLHH and the signal of the band LLLL, thereby reconstructing the signal of the band LL in FIG. 9A and sending the added signal to the switching circuit 1603.

The detection circuit 1606 takes out the quantization parameter included in the code train supplied from the low resolution video code input terminal 1501 and sends a control signal according to the parameter to the switching circuit 1603.

The switching circuit 1603 selects either the signal which is directly supplied from the low resolution video decoding circuit 1502 or the signal reconstructed by the addition circuit 1602 and supplies it to the up-sampler 1508 in response to the control signal. Considering the foregoing coding apparatus, in the block area in which the divisor of the quantization shown by the quantization parameter is equal to or less than a predetermined value, it is determined that the reinforcement is unnecessary. The signal which is directly supplied from the low resolution video decoding circuit 1502 is selected and outputted. In the block area in which the divisor exceeds the predetermined value, it is decided that the deterioration cannot be allowed. The signal which is supplied from the addition circuit 1602 is selected and generated.

The up-sampler 1508 inserts a "0" value into the supplied signal train in the horizontal and vertical directions and supplies the resultant signal train to the low pass filter 1509. The low pass filter 1509 allows only the band LL in FIG. 9A in the signal train which is supplied from the up-sampler 1508 to pass and supplies it to the addition circuit 1510.

The up-sampler 1511 inserts a "0" value into the supplied signal train in the horizontal and vertical directions and supplies the resultant signal train to the high pass filter 1512. The high pass filter 1512 allows only the bands LH, HL, and HH in FIG. 9A in the signal train which is supplied from the up-sampler 1511 to pass and supplies them to the addition circuit 1510.

The addition circuit 1510 adds the supplied band LL and the supplied bands LH, HL, and HH, thereby reconstructing the whole band of the high resolution video image and supplying it to the switching circuit 1503. The switching circuit 1503 selects the signal which is supplied from the addition circuit 1510 and generates it to the video signal output terminal 1504.

As mentioned above, in the high efficient coding apparatus and high efficient decoding apparatus of the embodiment, since the coding circuit and decoding circuit for the low resolution video image similar to the conventional ones are used with respect to the coding and decoding of the low frequency component of the high resolution video signal, the high compatibility with the conventional apparatus which does not cope with the high resolution video image can be maintained.

On the other hand, the high frequency components (corresponding to LLHH, LLHL, LLLH) in the low frequency component are separately extracted and encoded together with the high frequency components (corresponding to HH, HL, LH) in the high resolution video signal and decoded. The deterioration of the low frequency component is reinforced, so that the high video quality can be realized. In this case, since it is not always necessary to perform the reinforcement to an area where there is no deterioration or the deterioration is small, the information amount can be reduced and there is an effect such that the coding efficiency is not deteriorated.

In the embodiments, the code of the low frequency component and the code of the high frequency component are separated and outputted/inputted between the coding apparatus and the decoding apparatus. However, those codes can be multiplexed and outputted/inputted. That is, an apparatus such that those codes are mixedly recorded onto the same track on the magnetic recording tape or an apparatus such that they are frequency multiplexed and transmitted by a single carrier wave is also included in the present invention.

Although the preferred embodiments of the present invention have been described above, the object of the invention can be accomplished by a method whereby a memory medium (or recording medium) on which program codes of software to realize the foregoing functions of the embodiments have been recorded is supplied to a system or an apparatus, a computer (or a CPU or an MPU) of the system or apparatus reads out the program codes stored on the memory medium, and executes them. In this case, the program codes themselves read out from the memory medium realize the foregoing functions of the embodiments. The memory medium on which the program codes have been stored constructs the present invention. The invention also incorporates not only a case where the functions of the embodiments mentioned above are realized by executing the read-out program codes by the computer but also a case where the operating system (OS) or the like operating on the computer executes a part or all of the actual processes on the basis of instructions of the program codes and the functions of the embodiments mentioned above are realized by those processes.

Further, the invention also includes a case where the program codes read out from the memory medium are written into a memory provided for a function expanding card inserted into a computer or a function expanding unit connected to the computer and, after that, a CPU or the like equipped for the function expanding card or function expanding unit executes a part or all of the actual processes on the basis of instructions of the program codes, and the foregoing functions of the embodiments are realized by those processes.

The technical ideas of the coding/decoding apparatuses of the foregoing first to the fifth embodiments can be applied to various apparatuses. For example, they can be applied to the following digital VCR.

Figure 17:
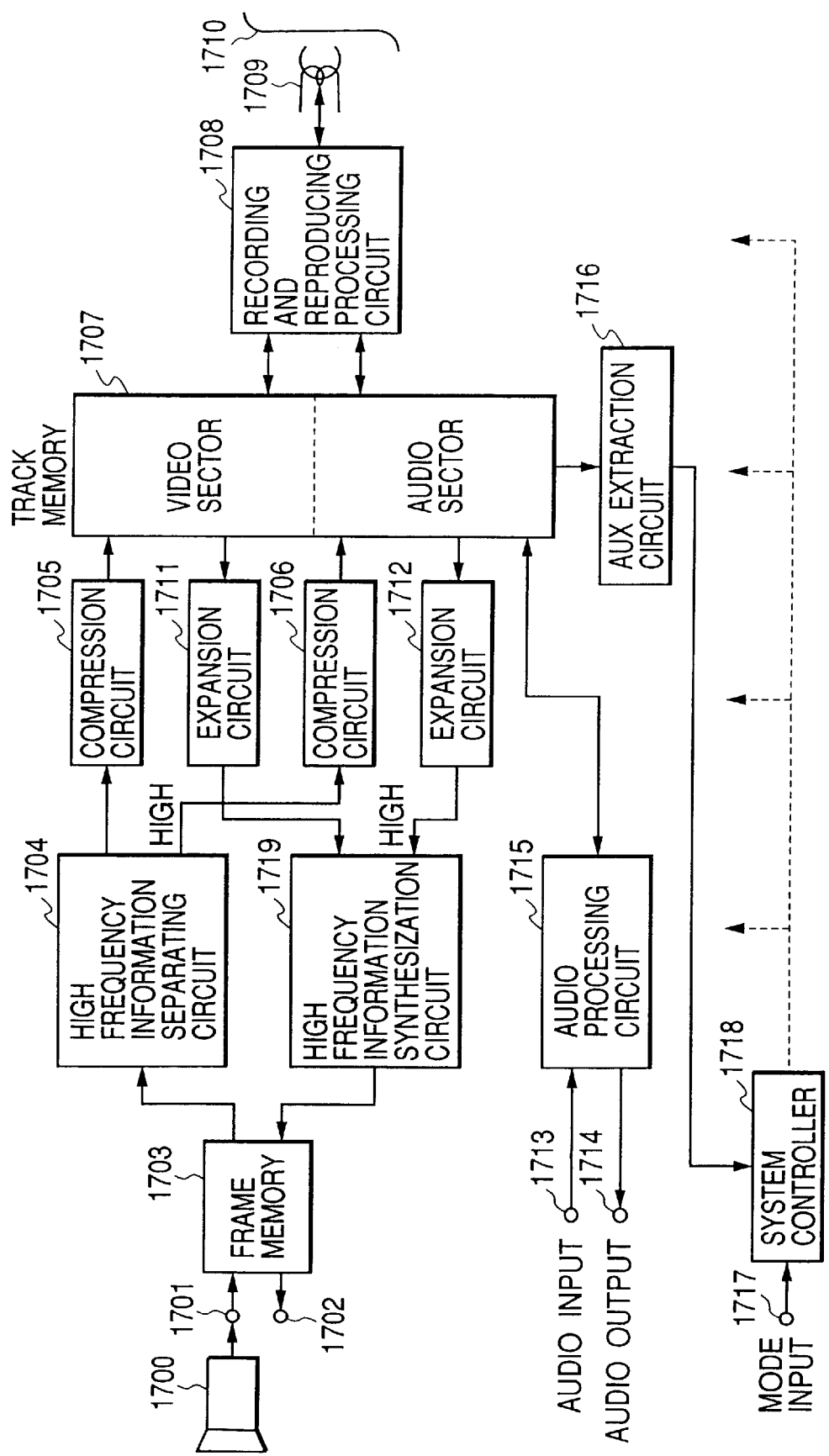
FIG. 17 is a block diagram of a digital VCR of another embodiment according to the invention.

FIG. 17 is a block diagram of a digital VCR according to the invention.

Reference numeral 1700 denotes a camera unit to photograph an object image and generate an image signal; 1701 an input terminal to which the image signal from the camera unit 1700 is inputted; 1702 an output terminal which is used to output a monitor image upon recording or output an image upon reproduction; and 1703 a frame memory to store an image of a frame unit. Using frame memory, a picture plane is divided into blocks suitable for compression or the divided blocks are synthesized.

Reference numeral 1704 denotes a high frequency information separating circuit to separate an image into normal image information according to the standard and high frequency information; 1705 a compression circuit to compress the normal image information by DCT or quantization; 1706 a compression circuit to compress the high frequency information of the image; 1711 an expansion circuit to decompress the compressed normal image information; 1712 an expansion circuit to decompress the high frequency information of the compressed image; and 1719 a high frequency information synthesization circuit to synthesize the normal image information and the high frequency information.

Reference numeral 1707 denotes a track memory to arrange the audio information and the image information in order so as to construct a recording track; 1709 a magnetic head; 1710 a magnetic tape; and 1708 a recording and reproducing processing circuit. The recording and reproducing processing circuit 1708 adds a tracking signal or other additional information to information read out from the track memory 1707, sends the resultant information to the magnetic head 1709, amplifies a signal from the magnetic head 1709, and reproduces information on the track formed on the magnetic tape 1710.

Reference numeral 1713 denotes an audio input terminal to which an audio signal is inputted from the outside upon recording or after-recording; 1714 an audio output terminal which is used to output a monitor audio sound upon recording or output an audio sound upon reproduction; 1715 an audio processing circuit for recording and reproducing; 1716 an AUX extraction circuit to extract information added to the image information or audio information upon reproduction; 1717 a mode input terminal to which the recording mode, reproducing mode, after-recording mode, or the like is inputted; and 1718 a system controller to control each circuit in accordance with the mode inputted from the mode input terminal 1717.

The operation of the recording and reproducing apparatus constructed as mentioned above will now be described hereinbelow.

During the normal motion image recording or in a still image recording mode, when an instruction for the high picture quality still image recording is issued to the system controller 1718 through the mode input terminal 1717, a frame image including up to high frequency components is first stored into the frame memory 1703 on the basis of the control of the system controller 1718. The high frequency information separating circuit 1704 extracts a luminance (Y) signal comprising 480 pixels (in the vertical direction) and 0720 pixels (in the lateral direction) and a chrominance signal corresponding thereto. The compression circuit 1705 compresses information of those signals. The track memory 1707 stores the compressed information into a video recording area (Video Sector). The high frequency information is separated by the high frequency information separating circuit 1704, compressed by the compression circuit 1706, and stored in an area ST2 of an audio recording area (Audio Sector) in the track memory 1707.

The area ST2 is ordinarily used as an area to record the audio sound in the after-recording.

As for the area ST2 of the Audio Sector, since an amount of information which can be recorded is smaller than that of the Video Sector, the high frequency information cannot be fully stored in only the area ST2 corresponding to one frame and is recorded by using the area ST2 corresponding to a plurality of subsequent frames. It is also possible to construct such that while a still image stored in the frame memory 1703 is held in the frame memory 1703, the high frequency information of necessary frames is compressed or, the high frequency information of the amount as much as one frame is compressed in a lump, an audio recording area (Audio Sector) corresponding to a plurality of frames is provided, and the compressed information is stored therein.

Figure 18:
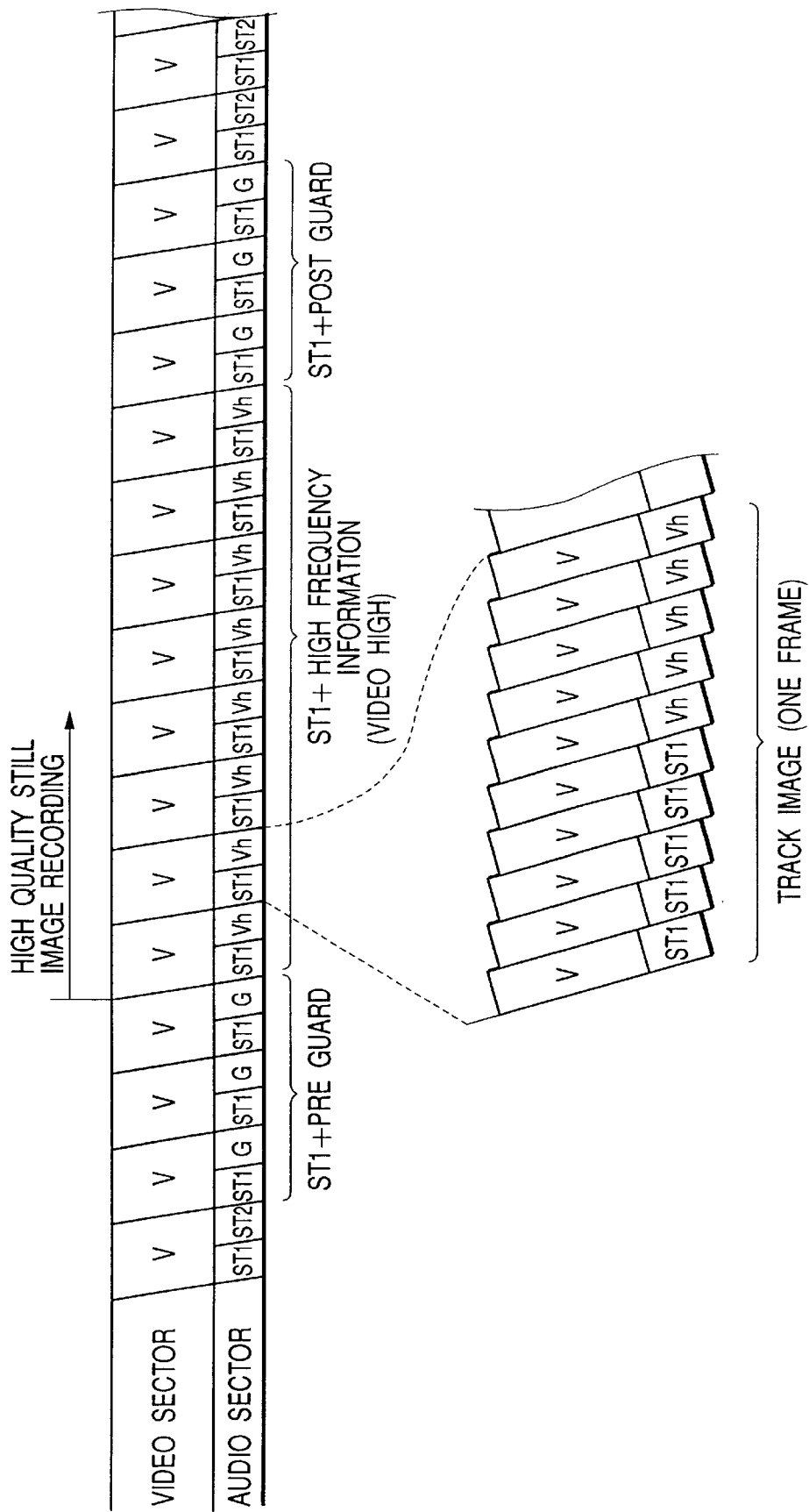
FIG. 18 is a diagram showing a recording pattern on a magnetic tape 1710 when a high picture quality still image is recorded by the digital VCR in FIG. 17.

FIG. 18 is a diagram showing a recording pattern on the magnetic tape 1710 at the time of the high quality still image recording. As will be understood from the diagram, when a high quality still image is recorded onto the magnetic tape 1710, a pre guard signal is recorded into the area ST2 of the Audio Sector among the first some frames (1 frame or more) and, thereafter, the compressed high frequency information is recorded.

A post guard signal is recorded into the area ST2 of the Audio Sector among a few frames (1 frame or more) after completion of the recording. The pre guard signal and the post guard signal are signals which are not concerned with the high frequency information and audio information.

An identification flag (ID flag) showing that the high frequency information of the image has been recorded in the Audio Sector is added as additional information to the image and stored into the Video Sector at the time of the high quality still image recording. The ID flag is also stored into the Video Sector of the frame where the pre guard signal and post guard signal are recorded as shown in FIG. 18.

When an audio sound is after-recorded onto the magnetic tape 1710 which has once been recorded, under the control of the system controller 1718, the AUX extraction circuit 1716 always reads out the additional information of the image written in the Video Sector of each frame and confirms whether the recorded information includes the high frequency information or not by checking the presence or absence of the ID flag. In case of the recording in which no high frequency information is included, the audio sound for after-recording is recorded into the area ST2 of the Audio Sector. On the other hand, in case of the recording including the high frequency information, the system controller 1718 controls each circuit so as to stop the after-recording.

By the above processes, even if the after-recording operation is performed, the high frequency information of the image is not deleted.

Since it takes long time until the after-recording operation is actually stopped, it is presumed that the audio sound for after-recording is overlapped to the area ST2 where the high frequency information of the high quality still image was recorded just before the after-recording operation is actually stopped. However; such a situation is prevented and it will be explained with reference to FIG. 19.

Figure 19:
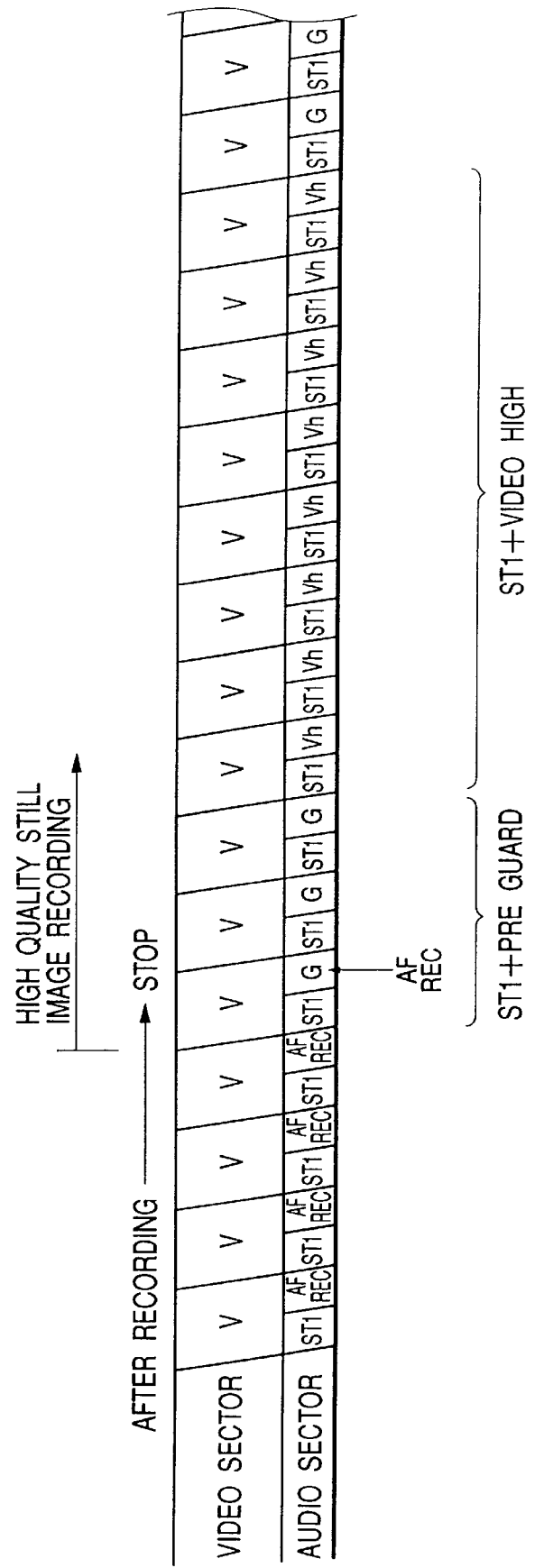
FIG. 19 is a diagram showing a recording pattern on the magnetic tape in an after-recording mode.

FIG. 19 is a diagram showing a recording pattern on the magnetic tape upon after-recording. That is, even if the addition of the ID flag is detected, it takes long time until the after-recording operation is actually stopped, so that there is a case where the audio sound for after-recording is recorded into the area ST2 of the Audio Sector. However, in at least the first frame among the frames where the high frequency information should be recorded (even in the second and subsequent frames in dependence on the setting contents), the pre guard signal is merely recorded in the area ST2 of the Audio Sector and the compressed high frequency information itself is not recorded. Therefore, the high frequency information of the image is not deleted at the time of after-recording.

In case of further tag-recording a motion image or still image after the high quality still image was recorded, there is a possibility such that the data of the subsequent image is overlapped to the area ST2 of the Audio Sector in the recording frame of the high quality still image. However, the post guard signal is merely recorded in the area ST2 of the final frame of the high quality still image (a plurality of preceding frames when they are counted from the end in dependence on the setting contents) and the compressed high frequency information itself is not recorded as mentioned above. Therefore, the high frequency information of the image is not deleted.

The foregoing embodiment of the VCR enables the recording of a video signal of a higher picture quality than the ordinary one while the compatibility with the conventional apparatus is held. If the high resolution video signal encoded by the coding/decoding apparatus according to the foregoing first to the fifth embodiments is recorded by using the recording method of the embodiment of the VCR mentioned above, the compatibility with the conventional apparatus can be held and the video signal of a higher resolution than the conventional one can be obtained.

In other words, the foregoing description of embodiments has been given for illustrative purposes only and not to be construed as imposing any imitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
    a) input means for selectively inputting a first image signal and a second image signal whose resolution is higher than that of said first image signal;
    b) separating means for separating a low frequency component and a high frequency component from said second image signal input by said input means, wherein said separating means converts an image signal of said low frequency component so that the resolution thereof is equal to that of said first image signal;
    c) first coding means for encoding said first image signal or the image signal of the low frequency component separated by said separating means; and d) second coding means for encoding an image signal of the high frequency component separated by said separating means.

2. An apparatus according to claim 1, wherein said input means includes converting means for converting said second image signal into an image signal of a predetermined resolution.

3. An apparatus according to claim 1, further comprising recording means for recording the image signal encoded by said first coding means and the image signal encoded by said second coding means onto a recording medium.

4. An apparatus according to claim 3, further comprising audio input means for inputting an audio signal and third coding means for encoding said audio signal, and wherein said recording means records the audio signal encoded by said third coding means onto said recording medium.

5. An apparatus according to claim 4, wherein said recording means records said audio signal encoded by said third coding means and the image signal encoded by said first coding means onto different recording areas on said recording medium and records the image signal encoded by said second coding means onto the recording area of said audio signal.

6. An apparatus according to claim 1, wherein said first image signal is a motion image signal and said second image signal is a still image signal.

7. A video camera having an image processing apparatus according to claim 1.

8. An image processing method comprising the steps of:

inputting selectively a first image signal and a second image signal whose resolution is higher than that of said first image signal;

separating a low frequency component and a high frequency component from said second image signal inputted in said input step, wherein said separating step converts an image signal of said low frequency component so that the resolution thereof is equal to that of said first image signal;

encoding said first image signal or the image signal of said separated low frequency component; and encoding an image signal of said separated high frequency component.

9. An image processing apparatus for separating a low frequency component and a high frequency component from a first image signal, converting a resolution of an image signal of said low frequency component, encoding the converted low frequency compnent, encoding an image signal of said high frequency component, and decoding the image signal of the low frequency component and the image signal of the high frequency component which were independently encoded, comprising:

(a) first decoding means for decoding said encoded image signal of the low frequency component;

(b) second decoding means for decoding said encoded image signal of the high frequency component; and (c) synthesizing means for synthesizing the image signal decoded by said first decoding means and the image signal decoded by said second decoding means.

10. An apparatus according to claim 9, wherein said first image signal is converted so as to become an image signal of a predetermined resolution.

11. An apparatus according to claim 10, further comprising converting means for converting a resolution of an image signal which is outputted from said synthesizing means.

12. An apparatus according to claim 10, wherein an encoded second image signal whose resolution is lower than that of said first image signal is inputted, and said first decoding means selectively decodes said encoded second image signal and said encoded image signal of the low frequency component.

13. A video camera having an image processing apparatus according to claim 9.

14. An image processing method of separating a low frequency component and a high frequency component from a first image signal, converting a resolution of an image signal of said low frequency component, encoding the converted low frequency component, encoding an image signal of said high frequency component, and decoding the image signal of the low frequency component and the image signal of the high frequency component which were independently encoded, comprising the steps of:

decoding said encoded image signal of the low frequency component;

decoding said encoded image signal of the high frequency component; and synthesizing said decoded image signal of the low frequency component and said decoded image signal of the high frequency component.

* * * * *